United States Patent
Sanai et al.

(10) Patent No.: US 7,367,053 B2
(45) Date of Patent: Apr. 29, 2008

(54) PASSWORD STRENGTH CHECKING METHOD AND APPARATUS AND PROGRAM AND RECORDING MEDIUM THEREOF, PASSWORD CREATION ASSISTING METHOD AND PROGRAM THEREOF, AND PASSWORD CREATING METHOD AND PROGRAM THEREOF

(75) Inventors: Daiji Sanai, Kanagawa (JP);
Michiharu Arimoto, Kanagawa (JP);
Takashi Mishima, Kanagawa (JP);
Hidenobu Seki, Kanagawa (JP)

(73) Assignee: Yamatake Corporation, Tokyo (JP)

( * ) Notice: Subject to any disclaimer, the term of this patent is extended or adjusted under 35 U.S.C. 154(b) by 744 days.

(21) Appl. No.: 10/677,277

(22) Filed: Oct. 3, 2003

(65) Prior Publication Data
US 2004/0073815 A1 Apr. 15, 2004

(30) Foreign Application Priority Data

| Oct. 11, 2002 | (JP) | 2002-298190 |
| Dec. 18, 2002 | (JP) | 2002-366243 |
| Dec. 18, 2002 | (JP) | 2002-366258 |

(51) Int. Cl.
*H04L 9/00* (2006.01)
*H04L 9/32* (2006.01)

(52) U.S. Cl. .................. 726/6; 713/183; 713/184; 726/18

(58) Field of Classification Search ................ 713/183, 713/184, 188, 189; 726/6, 13, 14, 18
See application file for complete search history.

(56) References Cited

U.S. PATENT DOCUMENTS

| 5,394,471 A | * | 2/1995 | Ganesan et al. | 713/183 |
| 5,588,056 A | * | 12/1996 | Ganesan | 713/183 |
| 5,592,553 A | * | 1/1997 | Guski et al. | 713/159 |
| 5,606,663 A | * | 2/1997 | Kadooka | 726/18 |
| 5,862,323 A | * | 1/1999 | Blakley et al. | 726/13 |
| 6,079,021 A | * | 6/2000 | Abadi et al. | 726/14 |
| 6,145,086 A | * | 11/2000 | Bellemore et al. | 726/18 |
| 7,058,817 B1 | * | 6/2006 | Ellmore | 713/183 |
| 7,120,302 B1 | * | 10/2006 | Billester | 382/229 |
| 2001/0026231 A1 | * | 10/2001 | Satoh | 341/87 |
| 2001/0034617 A1 | * | 10/2001 | Kimata | 705/3 |

(Continued)

OTHER PUBLICATIONS

Jianxin Jeff Yan, "A Note on Proactive Password Checking", Sep. 2001, Computer laboratory, University of Cambridge, pp. 127-135.*

(Continued)

*Primary Examiner*—Gilberto Barron
*Assistant Examiner*—Laurel Lashley

(57) ABSTRACT

A password strength checking method has the steps of inputting a password to be checked, generating a plaintext password candidate according to the same generation procedure as that used by a password guessing tool, determining whether or not the inputted password and the generated password candidate match each other, directing generation of the next password candidate when the match is not determined, determining strength of the inputted password based on the number of the generated password candidates when the match is determined, and outputting information of the determined password strength.

7 Claims, 31 Drawing Sheets

U.S. PATENT DOCUMENTS

2002/0087892 A1* 7/2002 Imazu ......................... 713/202
2003/0126501 A1* 7/2003 Musman ....................... 714/26
2003/0131266 A1* 7/2003 Best et al. ................... 713/202
2003/0163738 A1* 8/2003 Couillard .................... 713/202
2004/0025046 A1* 2/2004 Blume ........................ 713/200
2005/0044390 A1* 2/2005 Trostle ...................... 713/188

OTHER PUBLICATIONS

Bergadano et al. "Proactive Password Checking with Decision Trees", 1997, Conference on Computer ad Communication Security, pp. 67-77.*

Bishop, "Proactive Password Checking", Aug. 1992, 4th Workshop on Computer Security Incident Handling, pp. 1-9.*

Mishima et al., "Strong Password" to Win Brute Force, Nikkel Network Security, vol. 2, (2001), pp. 36-47.

* cited by examiner

FIG. 2

| RANK | USER NAME | SCORE | PASSWORD |
|---|---|---|---|
| 1 | ×××××××× | 64 POINTS | □□□□□□□□ |
| 2 | △△△△△△△△ | 47 POINTS | ○○○○○○○○ |
| · | · | · | · |
| · | · | · | · |
| · | · | · | · |

FIG. 5

HOW MANY DAYS CAN YOUR PASSWORD ENDURE!

USER NAME
PASSWORD
PASSWORD CONFIRMATION

[CHECK] [RETRY] [NEW]

| | TODAY'S TOP 50 | |
|---|---|---|
| | USER NAME | SCORE |
| 1 | | |
| 2 | | |
| 3 | | |
| 4 | | |
| 5 | | |
| 6 | | |
| 7 | | |
| 8 | | |
| 9 | | |
| 10 | | |
| 11 | | |

[END]

FIG. 6

HOW MANY DAYS CAN YOUR PASSWORD ENDURE!

| USER NAME | a dmin |
| PASSWORD | ************ |
| PASSWORD CONFIRMATION | ************** |

[CHECK] [RETRY] [NEW]

TODAY'S TOP 50

◄ ►

| | USER NAME | SCORE |
|---|---|---|
| 1 | | |
| 2 | | |
| 3 | | |
| 4 | | |
| 5 | | |
| 6 | | |
| 7 | | |
| 8 | | |
| 9 | | |
| 10 | | |
| 11 | | |

[END]

FIG. 7

HOW MANY DAYS CAN YOUR PASSWORD ENDURE!

USER NAME: a dmin

PASSWORD: **********

PASSWORD CONFIRMATION: **********

CHECK  RETRY  NEW

[x] PASSWORD DOES NOT MATCH.
ENTER A NEW PASSWORD IN BOTH BOXES.

OK

TODAY'S TOP 50

| | USER NAME | SCORE |
|---|---|---|
| 1 | | |
| 2 | | |
| 3 | | |
| 4 | | |
| 5 | | |
| 6 | | |
| 7 | | |
| 8 | | |
| 9 | | |
| 10 | | |
| 11 | | |

END

FIG. 8

HOW MANY DAYS CAN YOUR PASSWORD ENDURE!

USER NAME  a dmin

PASSWORD  ****************

PASSWORD CONFIRMATION  ****************

CHECK  RETRY  NEW

TOO WEAK.

3.9 POINTS

RANK : 4TH AMONG 6

ESTIMATED ANALYSIS TIME : 10 DAYS 11 HOURS 48 MINUTES

TOTAL NUMBER OF PASSWORDS : 7,555,858,447,480 296,694,415,884TH

END

TODAY'S TOP 50

| | USER NAME | SCORE |
|---|---|---|
| 1 | a dmin | 49 |
| 2 | a dmin | 16 |
| 3 | a dmin | 15 |
| 4 | a dmin | 3.9 |
| 5 | test | 3.1 |
| 6 | a dmin | 0.2 |
| 7 | | |
| 8 | | |
| 9 | | |
| 10 | | |
| 11 | | |

FIG. 12

PASSWORD STRENGTH CHECKING SCREEN

PASSWORD TO BE INPUTTED

STARTING CHARACTER'S
PLACE (x-TH DIGIT)

ENDING CHARACTER'S
PLACE (y-TH DIGIT)

STRENGTH OF
CHARACTER STRING

EVALUATION

FIG. 13

PASSWORD STRENGTH CHECKING SCREEN

PASSWORD TO BE INPUTTED ta<u>na</u>ka

STARTING CHARACTER'S
PLACE (x-TH DIGIT)

3

ENDING CHARACTER'S
PLACE (y-TH DIGIT)

5

STRENGTH OF CHARACTER
STRING PORTION 5.8

EVALUATION

FIG. 25

PASSWORD CREATION/INPUT SCREEN

PASSWORD STRENGTH INPUT AREAS

[ ] YEARS [ ] DAYS

PASSWORD TO BE CREATED

CREATE

FIG. 27

PASSWORD CREATION/INPUT SCREEN

PASSWORD STRENGTH INPUT AREAS

| 2 | YEARS | | DAYS |

PASSWORD TO BE CREATED

```
BsvmRl6l
jyeH6?
mall1okL
CAappuc5
hs48i48
drdDf8f
nwslwp5c
Vt984uS
Pw1sCm$
Bpcaoff
```

CREATE

PASSWORD STRENGTH CHECKING METHOD AND APPARATUS AND PROGRAM AND RECORDING MEDIUM THEREOF, PASSWORD CREATION ASSISTING METHOD AND PROGRAM THEREOF, AND PASSWORD CREATING METHOD AND PROGRAM THEREOF

BACKGROUND OF THE INVENTION

1. Field of the Invention

This invention relates to a password strength checking method and apparatus and a program and recording medium thereof; a password creation assisting method and a program thereof; and a password creating method and a program thereof In particular, the present invention relates to a password strength checking method and apparatus for checking strength of a password; a password strength checking program used for realizing the password strength checking method and a recording medium having the program recorded thereon; a password creation assisting method for assisting creation of a strong password by analyzing and outputting which portions of the password are strong and which portions thereof are weak; a password creation assisting program used for realizing the password creation assisting method; a password creating method for allowing a password with a guaranteed strength to be created; and a password creating program used for realizing the password creating method.

2. Description of the Related Art

When a user utilizes a system operating on a computer, whether the user is the person authenticated to use the system is determined by having the user input the same password that has been registered with the computer in advance.

Because there is a possibility that a password registered with a computer may be stolen, the password is encrypted. When a user inputs a plaintext password for utilizing a system, it is encrypted. By determining whether the encrypted password matches the registered encrypted password, it is determined whether or not the user is the person authenticated to use the system.

A password registered with a computer is usually encrypted using a one-way cryptography (a cryptography in which it is difficult to restore ciphertext to plaintext) in order to assure security. Accordingly, when a malicious user obtains an encrypted password registered with a computer, he executes an attack called brute force using a password guessing tool such as "John the Ripper" to steal a plaintext password associated with the encrypted password (see Non-patent Document 1, for example). The Non-patent Document 1 is "'strong Password' to Win Brute Force", Mishima et al., Nikkei Network Security, Vol. 2, pp. 36-47 (2002), for example.

Specifically, as shown in FIG. 31, an attack called brute force is executed, in which all possible characters to be used as a password are combined to generate plaintext password candidates and determination is repeatedly made about whether or not each of the encrypted (hashed) plaintext password candidates matches the encrypted password registered with the computer. This allows the plaintext password associated with the encrypted password to be stolen. The brute force may be also executed to obtain a password when a user forgets the password.

It is essential to set a strong password to assure security. However, there is no clear criterion for a strong password at present. Accordingly, it is the actual condition that users do not know well what password should be set. Though they may be advised to "use a long password" or "mix alphanumerical characters and symbols to make a password", they actually do not know what password should be set.

In order to prevent a password from being stolen by a malicious user, it is necessary to prevent a plaintext password from being obtained by a brute force attack in a short time.

It is, therefore, conceivable to measure a duration of time, which would be required until a password was stolen after a brute force attack using a password guessing tool, and use the duration of time as the password strength.

Though such a password strength defined in this way is suitable because it indicates the level of security, it is practically impossible to adopt the method. This is because the number of possible combinations of characters to be used as a password, in a brute force attack using a password guessing tool, will be an astronomical value and furthermore the combinations must be encrypted, and therefore several months may be required to determine the password strength. Thus, the prior-art technology does not provide a numerical representation of a password strength and, therefore, a user can only set a password that he believes to be strong.

With the above-mentioned background, we propose a novel password strength checking technique that enables calculation of a numerically represented password strength within a practical duration of time. In this new password strength checking technology, a password strength is obtained by measuring a time length during which the password can endure a brute force attack against it.

As a password guessing tool used for such a brute force attack, there is recently used a password guessing tool, such as "John the Ripper", for generating password candidates based on statistical information of appearance frequency of characters to execute an efficient brute force attack (see the above-mentioned Non-patent Document 1).

In the above-mentioned new password strength checking technology, on the assumption of a password guessing tool, such as "John the Ripper", for generating password candidates based on statistical information of appearance frequency of characters, strength of a password to be checked is measured by identifying how many times password generation is made by the password guessing tool to obtain the password to be checked (corresponding to a time length during which it endures a brute force attack).

In this measurement, in the above-mentioned new password strength checking technology, password candidates before encryption that are generated by a password guessing tool are checked with the plaintext password to be checked to measure strength of the password to be checked, thereby aiming at realizing measurement of the strength of the password to be checked within a practical duration of time.

A numerically represented password strength can be certainly calculated within a practical duration of time according to the above-mentioned new password strength checking technology.

In the above-mentioned new password strength checking technology, however, though the overall strength of a password can be numerically grasped, it is impossible to grasp which portions of the password are strong and which portions thereof are weak. There is left room for improvement.

A password created by a human being is apt to present some regularity, thereby tending to be a weak password. Accordingly, a password which is automatically generated by a password generating tool is traditionally set when a strong password is required.

Prior-art password generating tools, however, use a method of generating a password simply based on randomness and, therefore, a generated password is not always strong. In other words, when using a prior-art password generating tool, which uses the method of generating a password simply based on randomness, regularity is not presented unlike the case of a password created by a human being, while a generated password may not be necessarily strong.

In the present invention, focusing attention on the point that a password strength obtained by the above-mentioned new password strength checking technology can be associated with a generation rank of a password candidate generated by a password guessing tool, a user is made to input such a password strength, and a generation rank associated with the strength of the inputted password is determined. And then, a password is created using a password guessing tool based on the generation rank.

Furthermore, in the present invention, focusing attention on the point that a password strength obtained by the above-mentioned new password strength checking technology can be associated with a generation rank of a password candidate generated by a password guessing tool, a user is made to input such generation rank information of a password candidate. And then, a password is created using a password guessing tool based on the inputted generation rank.

SUMMARY OF THE INVENTION

An object of the present invention is to provide a password strength checking method and apparatus enabling a password strength to be checked objectively and accurately, and a program and recording medium thereof, by enabling calculation of a numerically represented password strength within a practical duration of time.

Another object of the present invention is to provide a password creation assisting method for assisting creation of a strong password by analyzing and outputting which portions of a password are strong and which portions thereof are weak, and a program thereof.

Still another object of the present invention is to provide a password creating method for enabling creation of a password with a guaranteed strength and a program thereof.

In order to achieve the objects, a password strength checking method according to the present invention comprises inputting a password to be checked; generating a plaintext password candidate according to the same generation procedure at that used by a password guessing tool; determining whether or not the inputted password and the generated password candidate match each other; directing generation of the next password candidate when the match is not determined; determining strength of the inputted password based on the number of the generated password candidates when the match is determined; and outputting information of the determined password strength.

Furthermore, a password strength checking apparatus comprises means for inputting a password to be checked; means for generating a plaintext password candidate according to the same generation procedure as that used by a password guessing tool; means for determining whether or not the inputted password and the generated password candidate match each other; means for directing generation of the next password candidate when the match is not determined; means for determining strength of the inputted password based on the number of the generated password candidates when the match is determined; and means for outputting information of the determined password strength.

Furthermore, the password strength checking method realized by operation of each of the above processing means can be realized by a computer program, which can be provided in a suitable recording medium, such as a semiconductor memory, or can be provided via a network.

In the password strength checking apparatus according to the present invention, which is structured as mentioned above, when a password to be checked is inputted, a plaintext password candidate is generated according to the same generation procedure used by a password guessing tool and it is determined whether or not the inputted password and the generated password candidate match each other.

If the match is not determined, generation of the next password candidate is directed. In this way, password candidates are generated one by one until the inputted password and a generated password candidate match each other.

On the other hand, if the match is determined, a time required for a password guessing tool to attack the inputted password, for example, is estimated based on the number of generated password candidates to determine the estimated time as strength of the inputted password, or numerical information is calculated based on a ratio value of the possible maximum number of password candidates to be generated to the number of generated password candidates to determine the calculated numerical information as strength of the inputted password, and then information of the determined password strength is outputted.

In this case, rank information may be also outputted which indicates the rank identified by the password strength among passwords to be checked, for which a password strength has already been determined, in addition to output of information of the determined password strength.

In this structure, it is meaningless that a password without a nature of a password is to be checked. In order to avoid checking such a password, re-input of a password may be requested from a user, while the input state being presented to the user in such a form that the inputted content is not readable, so that the password to be checked is inputted only when the inputted two passwords match each other.

In consideration of the fact that a password corresponding to a user attribute is an extremely weak password, user attribute information such as a telephone number may be inputted when inputting a password, so that strength checking may be controlled not to be executed for the inputted password when the inputted user attribute information and the inputted password match each other.

In this way, according to the present invention, by measuring how many plaintext password candidates are generated by a password guessing tool used for a brute force attack to obtain, the password to be checked, the password strength is determined and outputted based on the number of generated plaintext password candidates. Accordingly, the numerically represented password strength can be calculated in a practical duration of time, and thereby it is possible to objectively and accurately check the password strength.

A password creation assisting method according to the present invention comprises inputting a password to be targeted by creation assistance and characters' places information for identifying a character string to be checked that is included in the password; using a password candidate generating tool for generating a plaintext password candidate according to the same generation procedure as that used by a password guessing tool to obtain the number of password candidates which have been generated by the time a password candidate having the character string at the characters' places is first generated; calculating strength of the character string based on the obtained number of generated password candidates; and outputting the calculated character string strength information.

Each of the steps described above can be realized by a computer program, which can be provided in a recording medium, such as a semiconductor memory, or via a network.

In the present invention structured as mentioned above, for example, when a character string "nak" to be checked is inputted by inputting a password to be targeted by creation assistance, "tanaka", and characters' places information, for example, "the third and fifth characters from the top", the number of password candidates is obtained which have been generated by the time a password candidate having the character string "nak" at the characters' places is first generated, using a password candidate generating tool for generating a plaintext password candidate according to the same generation procedure as that used by a password guessing tool.

Then, strength of the character string to be checked is calculated based on the obtained number of password candidates and outputted.

In this way, according to the present invention, strength of a character string included in a password is outputted, so that a user can grasp which portions of the password are strong and which portions thereof are weak and thereby create a strong password.

Furthermore, another password creation assisting method according to the present invention comprises inputting a password to be targeted by creation assistance; extracting all or a part of characters composing the inputted password together with places of the characters; identifying, for each of the extracted characters, a character rank at the extracted character position, with the extracted characters and the characters' places as a key, by referring to a table group recording character rank information for each character position, the table group being provided for a password guessing tool to use when guessing a password by checking all possible passwords; calculating character strength for each of the extracted characters based on the identified character rank; and outputting the calculated character strength information.

Each of the steps described above can be realized by a computer program, which can be provided in a recording medium, such as a semiconductor memory, or via a network.

In the present invention structured as mentioned above, when a password to be targeted by creation assistance "tanaka" is inputted, it is extracted that the first character is "t", the second "a", the third "n", the fourth "a", the fifth "k", and the sixth Then, by referring to a table group recording character rank information for each character position, the table group being provided for a password guessing tool to use when guessing a password by checking all possible passwords, the appearance order is identified for each of the first character "t" which appears tenthly among 95 characters, for example, the second character "a", the third character "n", the fourth character "a", the fifth character "k", and the sixth character "a".

Then, character strength for each of the extracted characters is calculated based on the identified character rank and outputted.

In this way, according to the present invention, strength is outputted for each character of a password, so that a user can grasp which portions of the password are strong and which portions thereof are weak and thereby create a strong password.

Furthermore, another password creation assisting method according to the present invention comprises inputting a password to be targeted by creation assistance; extracting character strings increasing in length by an increment of one character, with the first character of the inputted password as a top character; using a password candidate generating tool for generating a plaintext password candidate according to the same generation procedure as that used by a password guessing tool to obtain, for each of the extracted character strings, the number of password candidates which have been generated by the time a password candidate having the character string at the same characters' places is first generated; calculating a character strength transition value of the inputted password based on the obtained number of the generated password candidates; and outputting the calculated character strength transition value.

Each of the steps described above can be realized by a computer program, which can be provided in a recording medium, such as a semiconductor memory, or via a network.

In the present invention structured as described above, when a password to be targeted by creation assistance "tanaka" is inputted, a character string "t", a character string "ta", a character string "tan", a character string "tana", a character string "tanak" and a character string "tanaka" are extracted.

Then, for each of the extracted character strings, the number of password candidates is obtained, which have been generated by the time a password candidate having the character string at the same characters' places is first generated, for example, by the time a password candidate having a character string "tana" at the same characters' places is first generated, using a password candidate generating tool for generating a plaintext password candidate according to the same generation procedure used by a password guessing tool.

Then, a character strength transition value for the inputted password is calculated based on the obtained number of generated password candidates and outputted.

In this way, according to the present invention, a character strength transition value of characters of a password is outputted, so that a user can grasp which portions of the password are strong and which portions thereof are weak and thereby create a strong password.

A password creating method according to the present invention comprises inputting information of a generation rank for a password to be created; using a password candidate generating routine for generating a plaintext password candidate according to the same generation procedure as that used by a password guessing tool to obtain a password candidate generated for the generation rank by the password candidate generating routine; and outputting the obtained password candidate as a password to be created.

Furthermore, another password creating method according to the invention comprises inputting information indicating strength of a password to be created; converting the information indicating strength into information of a generation rank of a password candidate to be generated by a password candidate generating routine for generating a plaintext password candidate according to the same generation procedure as that used by a password guessing tool; using the password candidate generating routine to obtain a password candidate generated for the generation rank by the password candidate generating routine; and outputting the obtained password candidate as a password to be created.

Each of the steps described above can be realized by a computer program, which can be provided in a recording medium, such as a semiconductor memory, or via a network.

According to this structure and according to the present invention, it is possible to create a password with a guaranteed strength such as a password which can endure a brute force attack for two years, for example. Accordingly, a user can use a password without anxiety.

BRIEF DESCRIPTION OF THE DRAWINGS

FIG. 2 is an explanatory diagram of a ranking table.

FIG. 5 is an explanatory diagram of a password checking screen.

FIG. 6 is an explanatory diagram of a password checking screen.

FIG. 7 is an explanatory diagram of a password checking screen.

FIG. 8 is an explanatory diagram of a password checking screen.

FIG. 12 is an explanatory diagram of a password strength checking screen.

FIG. 13 is an explanatory diagram of a password strength checking screen.

FIG. 25 is an explanatory diagram of a input screen for password creation.

FIG. 27 is an explanatory diagram of a input screen for password creation.

DETAILED DESCRIPTION OF THE PREFERRED EMBODIMENTS

First Embodiment

Figure 1:
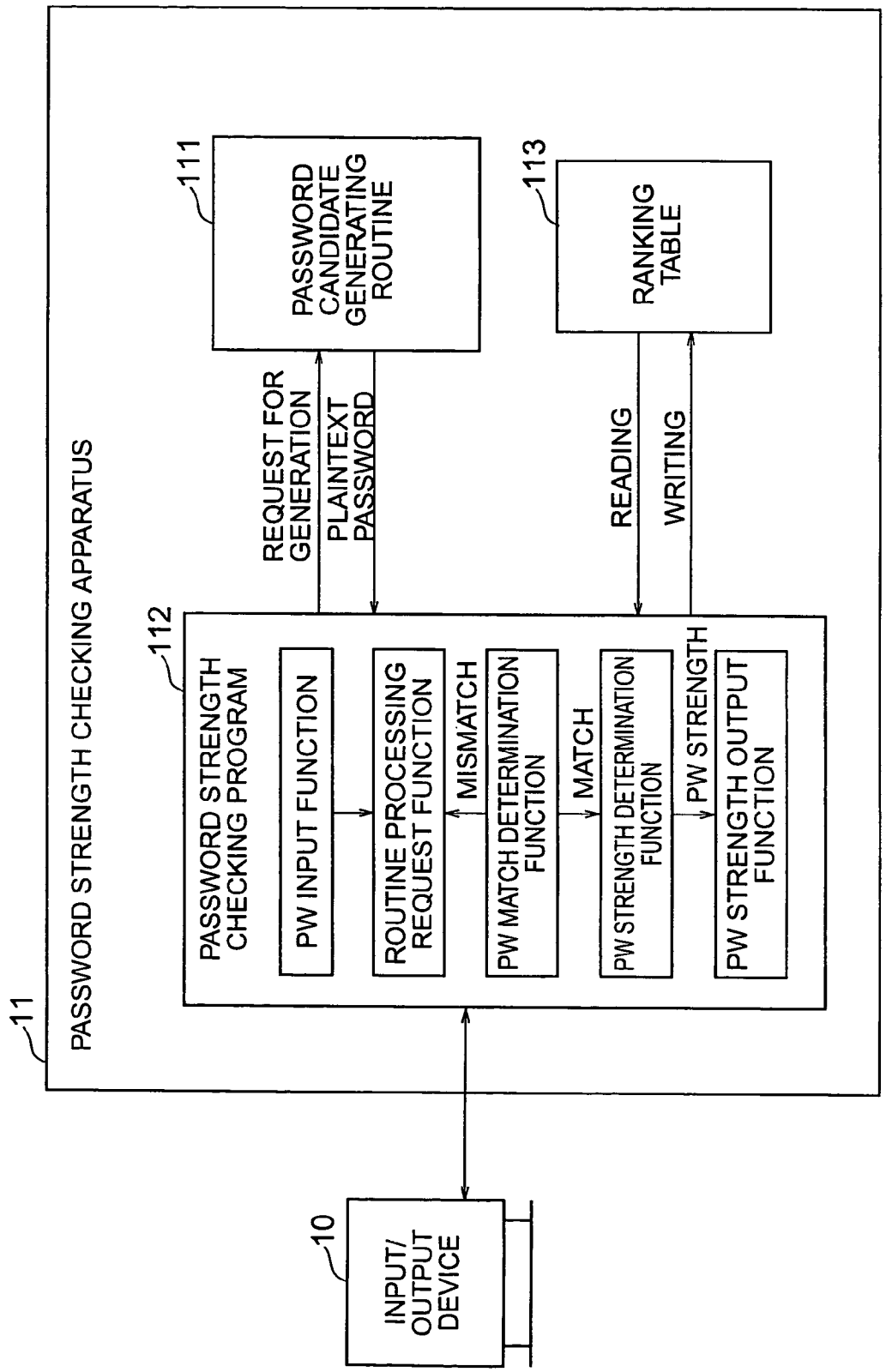
FIG. 1 shows an embodiment of the present invention.

The present invention will now be described below in detail according to a first embodiment of the present invention. FIG. 1 shows an embodiment of apparatus structure of a password strength checking apparatus 11 of the present invention.

The password strength checking apparatus 11 of the present invention shown in FIG. 1 is used to have a user learn how to set a strong password. As shown in FIG. 1, the password strength checking apparatus 11 comprises an input/output device 10 as means for interacting with a user, a password candidate generating routine 111 for generating a plaintext password candidate, which is used in a password guessing tool such as "John the Ripper", a password strength checking program 112 for checking strength of a password to be checked using a password candidate generating routine 111, and a ranking table 113 for recording results of the checking by the password strength checking program 112.

As seen from a process flow described later, the password candidate generating routine 111 is provided with functions of: inputting a password to be checked from the input/output device 10, requesting generation of a password candidate from the password candidate generating routine 111, determining whether or not the inputted password and the password candidate generated by the password candidate generating routine 111 match each other, determining strength of the inputted password based on the number of passwords generated by the password candidate generating routine 111, and outputting the determined password strength.

The password candidate generating routine 111 is used in a password guessing tool such as "John the Ripper". It generates more than 7 trillion plaintext password candidates in a predetermined order, for example, by first generating plaintext password candidates using character strings written in a dictionary and then generating plaintext password candidates using all possible character strings to be used as a password.

Figure 2:
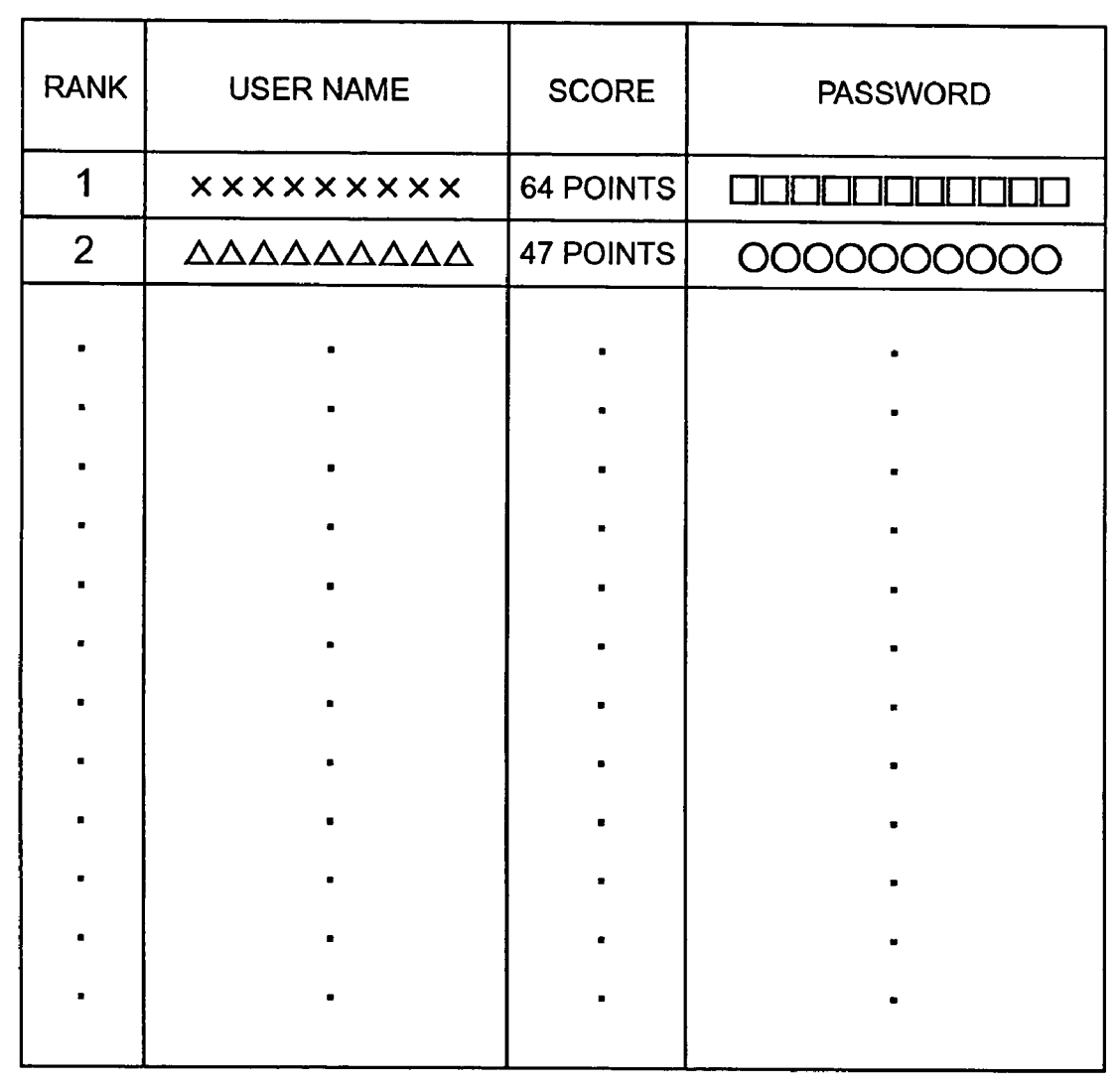

The ranking table 113 records results of the checking by the password strength checking program 112. As shown in FIG. 2, passwords that have been checked, names of the users who inputted the passwords, and scores for the passwords are recorded in descending order of score indicating password strength (a full score is 100 points), for example.

Figure 3:
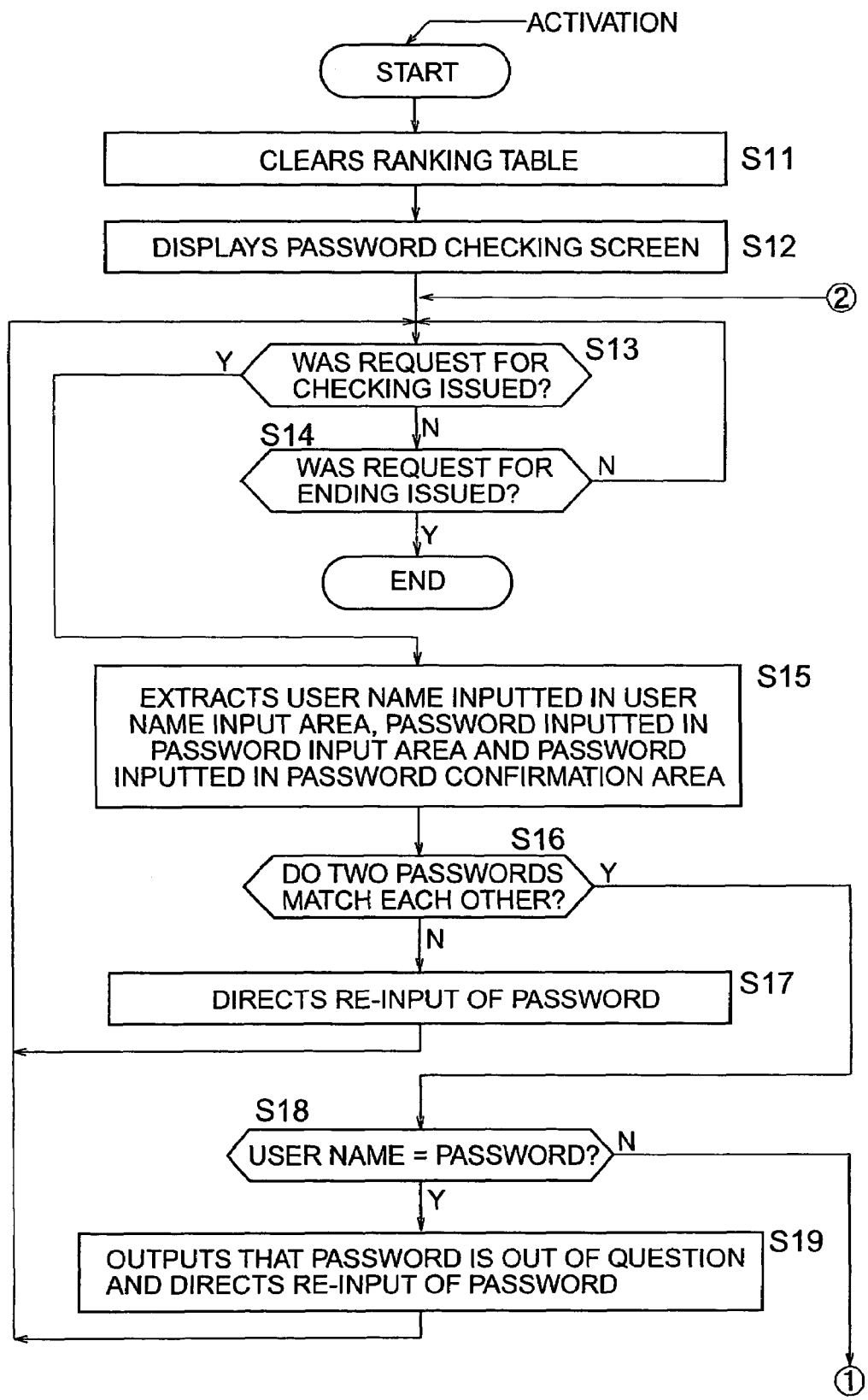
FIG. 3 shows an embodiment of a process flow executed by a password strength checking program.
Figure 4:
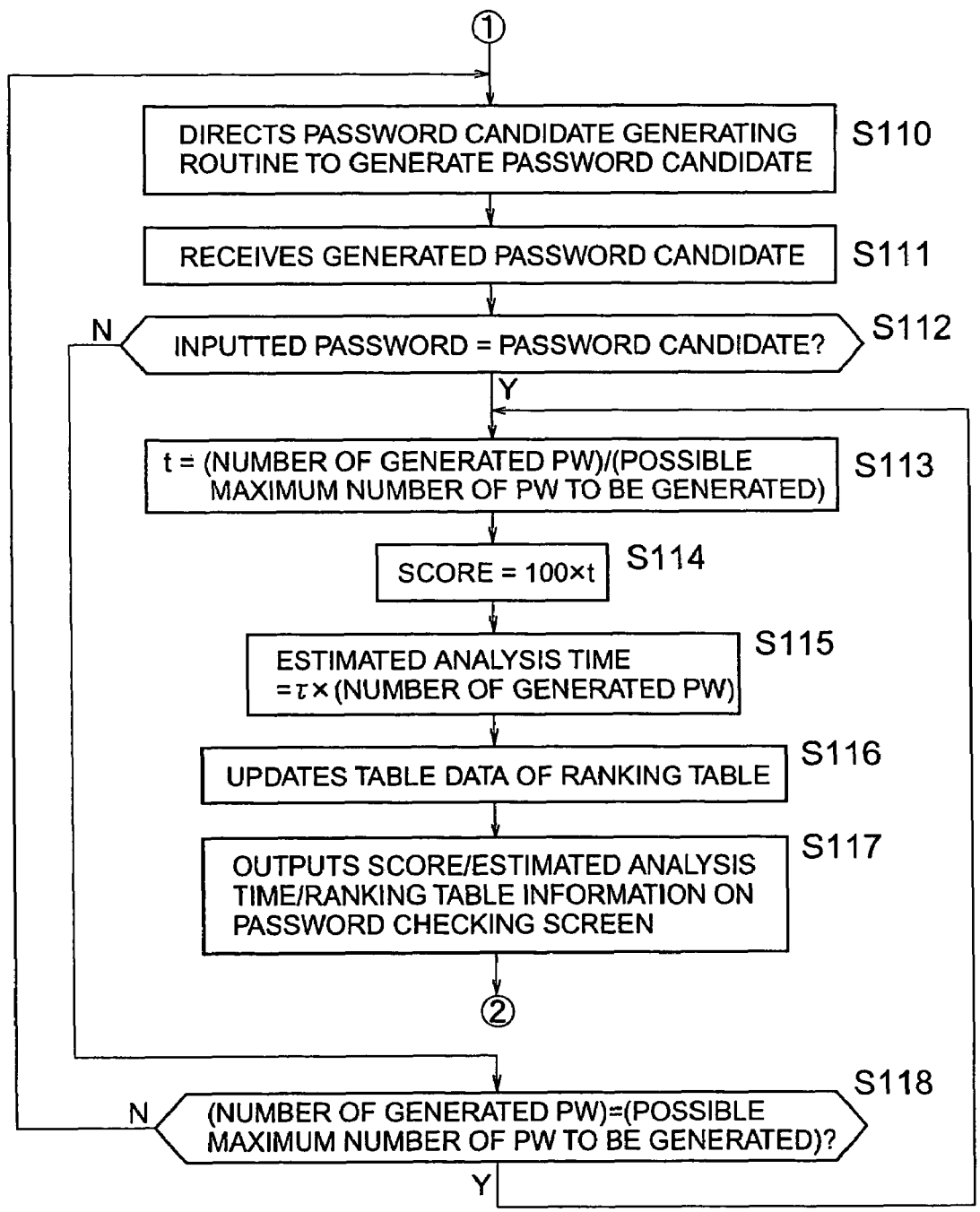
FIG. 4 shows an embodiment of a process flow executed by a password strength checking program.

FIGS. 3 and 4 show an embodiment of a process flow executed by the password strength checking program 112.

A password strength checking process according to the present invention will now be described in detail, following the process flow.

The password strength checking program 112, when activated by power-on of the password strength checking apparatus 11 of the present invention, first clears the ranking table 113 at step S11 as shown in the process flows in FIGS. 3 and 4.

A password checking screen as shown in FIG. 5 is then shown on the display of the input/output device 10 at step S12.

As shown in FIG. 5, the password checking screen is provided with three input areas, that is, an input area "user name", an input area "password", and a password input area called "password confirmation" as well as a display area for displaying information (except for the password) on the checking results to be recorded in the ranking table 113.

The "Check" button shown in the figure is provided to direct execution of checking of an inputted password. The "Retry" button is provided to direct clearance of the passwords inputted in the "password" and "password confirmation" areas while leaving the user name inputted in the "user name" area. The "New" button is provided to direct clearance of the user name inputted in the "user name" area and the passwords inputted in the "password" and "password confirmation" areas.

In response to display of the password checking screen, a user inputs a user name in the input area "user name", a password in the input area "password", and a password identical to the password inputted in the input area "password", in the input area "password confirmation" as shown in FIG. 6 and operates the "Check" button to issue a request for checking of the inputted password.

In this case, passwords themselves inputted in the input areas "password" and "password confirmation" are not shown, and instead a symbol such as "*" is used to indicate the input state.

A password checking screen is then displayed at step S12, and at the following step S13, it is determined whether or not the user has issued a request for checking the inputted password.

If it is determined that the user has not issued a request for checking a password based on the determination, then the process proceeds to step S14 to determine whether or not the user has issued a request for ending the checking process. If it is determined that the user has issued a request for ending the checking process, then the process ends. If it is determined that the user has not issued a request for ending the checking process, then the process returns to step S13 to wait for a request for checking a password to be issued by the user.

In other words, the user operates the "End" button provided for the password checking screen when ending the password checking process, so that operation of the "End" button is regarded as indicating that a request for ending the process has been issued by the user and, therefore, the process ends.

On the other hand, if it is determined that the user has issued a request for checking the password at step S13, then the process proceeds to step S15 to extract a user name inputted in the input area "user name", a password inputted in the input area "password", and a password inputted in the input area "password confirmation".

Then, at step S16, it is determined whether or not the two passwords extracted at step S15 match each other. If it is determined that the two passwords do not match each other, then the process proceeds to step S17 to direct re-input of a password on the password checking screen. The process then returns to step S13 to wait for a request for checking a password to be issued by the user.

If a user cannot input the same password in the input area "password" and the input area "password confirmation", it is assumed that the password should be a character string that the user cannot remember (or a string unusable as a password). Such a password should not be checked and, therefore, the process displays a direction to re-input a password on the password checking screen and returns to step S13 to wait for a request for checking a password to be issued by the user, as shown in FIG. 7.

On the other hand, if it is determined that the two passwords extracted at step S15 match each other at step S16, then the process proceeds to step S18 and determines whether or not the user name extracted at step S15 and the password extracted at step S15 match each other.

If it is determined that the user name extracted at step S15 and the password extracted at step S15 match each other based on the determination, then the process proceeds to step S19. At step S19, the process outputs on the password checking screen that the password is out of the question and directs re-input of a password. The process then returns to step S13 to wait for a request for checking a password to be issued by the user.

Because a password matching a user name is easily stolen, the process outputs that such a password is out of the question, directs re-input of a password and then returns to step S13 to wait for a request for checking a password to be issued by the user.

On the other hand, if it is determined at step S18 that the user name extracted at step S15 and the password extracted at step S15 do not match each other, then the process proceeds to step S10 and directs the password candidate generating routine 111 to generate a password candidate.

Upon receiving the direction to generate a password candidate, the password candidate generating routine 111 generates, according to the same generation procedure as that used by a password guessing tool, the first password candidate (plaintext) in the case that a password candidate is generated for the first time, and generates a password candidate (plaintext) following the previously generated password candidate in the case that the password candidate has been generated previously.

Then, at step S111, the generated password candidate is received from the password candidate generating routine 111. At the following step S12, it is determined whether or not the inputted password (password extracted at step S15) and the received password candidate match each other.

If it is determined that the inputted password and the password candidate received from the password candidate generating routine 111 match each other based on the determination, then the process proceeds to step S113 and calculates the ratio value t ($0 \leq t \leq 1$) of the number of password candidates which have been generated by the password candidate generating routine 111 by the time they match each other, to the possible maximum number of password candidates to be generated by the password candidate generating routine 111. In this case, t=(the number of the generated password candidates)/(the possible maximum number of password candidates).

Then, at step S114, a score indicating strength of the inputted password is calculated based on the following equation:

$$Score = 100 \times t.$$

Then, at step S115, a time is estimated which is required for analysis when a malicious user brute-force attacks the inputted password using a password guessing tool, based on the following equation:

Estimated analysis time=$\tau \times$(the number of the generated password candidates).

In the above equation, $\tau$ indicates a time required for generating and hashing a password candidate and comparing it with the encrypted password to be brute-force attacked to determine whether or not they match each other.

At step S116, the inputted password is registered with the ranking table 113 to update the table data of the ranking table 113. In this case, as seen from the table data of the ranking table 113 shown in FIG. 2, information (user name, score, password) of the inputted password is registered with the ranking table 113 by sorting the information according to the calculated scores.

Then, at step S117, as shown in FIG. 8, the calculated scores and estimated analysis times, and the information on the ranking table 113 are outputted to the password checking screen. The process then returns to step S13 to check the next password.

The password checking screen shown in FIG. 8 shows an example where there are outputted comment information, such as "too weak", defined in association with a score range, rank information, such as "the fourth among six", indicating a score rank among the passwords that have been inputted, the possible maximum number of password candidates to be generated by the password candidate generating routine 111, and the number of password candidates that have been generated by the time match with the inputted password can be acquired, in addition to the calculated score and the estimated analysis time.

On the other hand, if it is determined that the inputted password and the password candidate received from the password candidate generating routine 111 do not match each other based on the determination at step S112, then the process proceeds to step S118. At step S118, it is determined whether or not the number of password candidates that have been generated and the possible maximum number of password candidates to be generated by the password candidate generating routine 111 match each other. If it is determined that they do not match each other, then the process returns to step S110 to generate the next password candidate.

On the other hand, if it is determined that the number of password candidates that have been generated and the possible maximum number of password candidates to be generated by the password candidate generating routine 111 match each other based on the determination at step S118, then the process proceeds to step S113 because it is impossible to generate more password candidates. After calculating the above-mentioned ratio value t (t=1 in the case of using this route) at step S113, the process executes the processings from step S114 to step S117 and returns to step S13 to check the next password.

In this way, the password strength checking program 112 measures how many plaintext password candidates are generated by a password guessing tool used for a brute force attack to obtain, the password to be checked, and determines the strength of the password based on the number of the generated plaintext password candidates.

In this embodiment, a user is made to input his user name as user attribute information and, when the inputted user name and the inputted password match each other, it is outputted that such a password is out of the question. It is also possible to make a user input user attribute information other than his user name, such as his telephone number or his employee number, and to output, when the inputted user attribute information and the inputted password match each other, that such a password is out of the question.

In this embodiment, a password out of the question is so processed that it should not be registered with the ranking table 113. It is also possible to register such a password with the ranking table 113 by assigning a score such as −100 points thereto.

Second Embodiment

Figure 9:
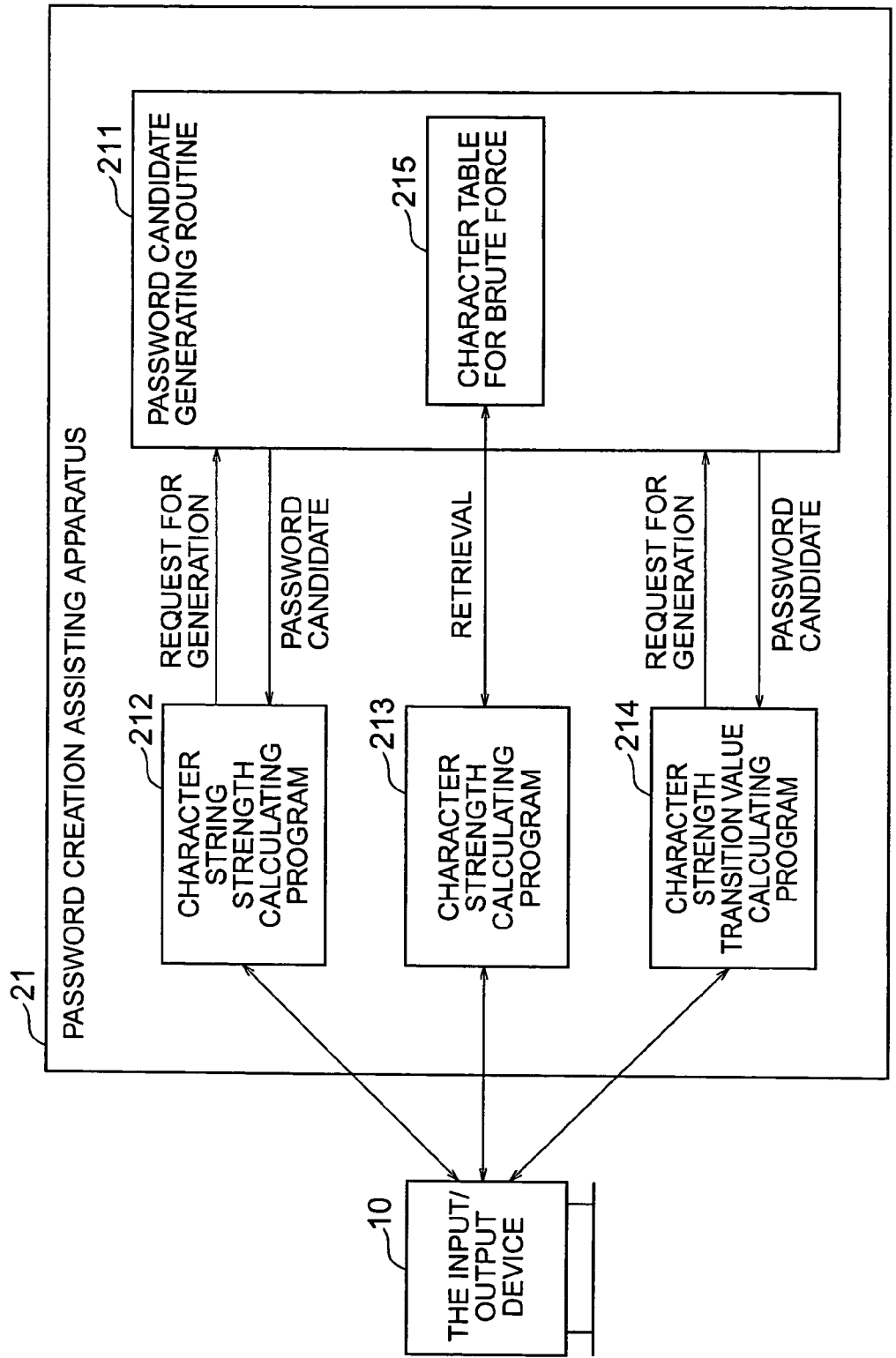
FIG. 9 shows an embodiment of a password creation assisting apparatus provided with the present invention.

The present invention will now be described below in detail according to a second embodiment of the present invention. FIG. 9 shows an embodiment of a password creation assisting apparatus 21 provided with the present invention.

The password creation assisting apparatus 21 provided with the present invention, shown in FIG. 9, performs processing for assisting creation of a password and comprises: an input/output device 10 as means for interacting with a user, a password candidate generating routine 211 (or 111) to be used by a password guessing tool such as "John the Ripper" to generate a plaintext password candidate, a character string strength calculating program 212 for using the password candidate generating routine 211 to calculate strength of a character string of a password to be checked, a character strength calculating program 213 for calculating strength of each character of the password to be checked by referring to a character table for brute force 215 that the password candidate generating routine 211 is provided with, and a character strength transition value calculating program 214 for using the password candidate generating routine 211 to calculate a character strength transition value of a character of the password to be checked.

The character string strength calculating program 212, the character strength calculating program 213 and the character strength transition value calculating program 214 that are prepared to realize the present invention are provided in a recording medium, such as a semiconductor memory, or via a network.

The password candidate generating routine 211 is used in a password guessing tool such as "John the Ripper". It generates more than 7 trillion plaintext password candidates in a predetermined order, for example, by first generating plaintext password candidates using character strings written in a dictionary and then generating plaintext password candidates using all possible character strings to be used as a password.

When generating a password candidate, the password candidate generating routine 211 uses the character table for brute force 215.

Figure 10:
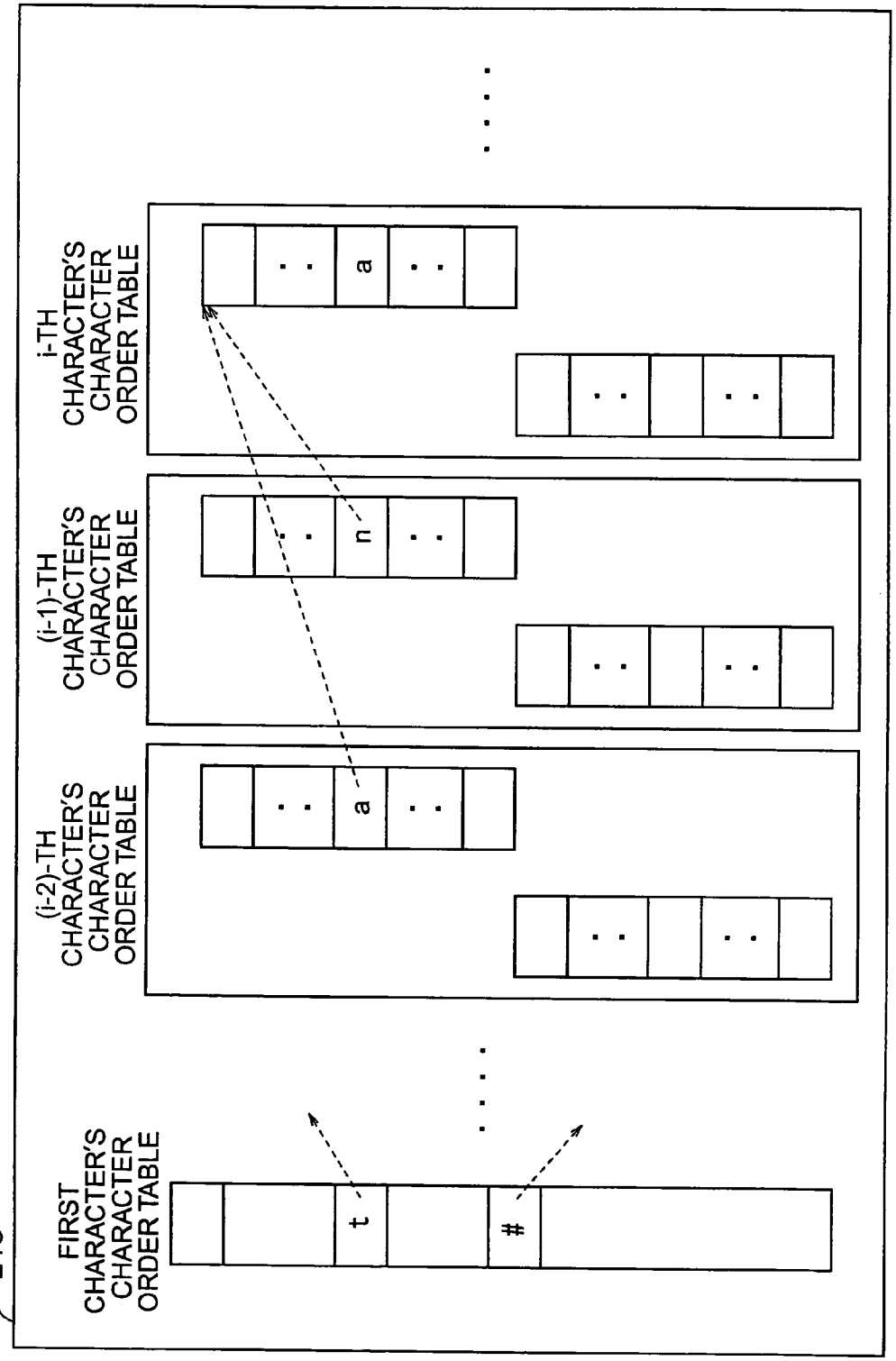
FIG. 10 shows an example of a table structure for a character table for brute force.

FIG. 10 shows an example of a table structure of the character table for brute force 215. The character table for brute force 215 shown in the figure is assumed to be one that the password guessing tool such as "John the Ripper" is provided with.

The password guessing tool such as "John the Ripper" guesses a password by using 95 characters (including numerics and symbols) to sequentially generate eight-digit password candidates. As for the generation of a password candidate, in what order (descending order according to frequency of appearance in the digit) password candidates should be generated for each digit (for each character position) is specified based on statistic information to generate a password candidate.

The order of characters is controlled by a character table for brute force 215 shown in FIG. 10. In this table, a character rank table provided in association with each digit is used to specify in what order password candidates should be generated for each digit based on statistic information.

In the case of a password guessing tool such as "John the Ripper", a character rank table used for a digit is determined based on the character for a digit immediately preceding the digit and the character for a digit further preceding the preceding digit. For example, as shown in FIG. 10, a particular character rank table is used for a digit when the character for a digit immediately preceding the digit is "n" and the character for a digit further preceding the preceding digit is "a".

A process will now be described according to the process flow shown in FIG. 11, which is executed by the character string strength calculating program 212 to realize the present invention.

When a password strength checking screen is shown on a display of the input/output device 10, which is provided with an input area for a password to be checked and input areas for a starting position of character (x-th digit)/ending position of character (y-th digit) as shown in FIG. 12, a user inputs a password to be checked and x-th/y-th digits indicating places to cut a character string into the input areas, thereby a request for checking strength of the password is issued. Then, the character string strength calculating program 212 first inputs the password to be checked and the x-th/y-th digits indicating places to cut a character string at step S20 as shown in the process flow in FIG. 11.

Then, at step S21, the character string specified by the inputted x-th/y-th digits is extracted from the inputted password. For example, if a password to be checked "tanaka" and "x=3, y=5" are inputted on the password strength checking screen as shown in FIG. 13, a character string "nak" specified by the inputted x-th/y-th digits is extracted.

Then, at step S22, "1" is set for a variable j indicating the number of password candidates to be generated, and at the following step S23, the password candidate generating routine 211 is directed to generate a password candidate.

Upon receiving the direction to generate a password candidate, the password candidate generating routine 211 generates, according to the same generation procedure as that used by a password guessing tool, the first password candidate (plaintext) in a case that a password candidate is generated for the first time, and generates a password candidate (plaintext) following the previously generated password candidate in the case that the password candidate has been generated previously.

Then, at step S24, the generated password candidate is received from the password candidate generating routine 211, and at the following step S25, the character string specified by the inputted x-th/y-th digits is extracted from the received password candidate.

Then, at step S26, it is determined whether or not the character string extracted at step S21 and the character string extracted at step S25 match each other. If it is determined that they do not match each other, then the process proceeds to step S27, where the value of the variable j is incremented by one. The process then returns to step S23 to direct generation of the next password candidate.

On the other hand, if it is determined at step S26 that the character string extracted at step S21 and the character string extracted at step S25 match each other, then the process proceeds to step S28, where strength of the character string of the inputted password, which is specified by the inputted x-th/y-th digits, is calculated from the value of j.

For example, the ratio value t ($0 \leq t \leq 1$) of the value of j (the number of password candidates that have already been received) to the possible maximum number of password candidates to be generated by the password candidate generating routine 211 is calculated as follows:

$t = j/$(the possible maximum number of password candidates to be generated).

And then, a score indicating strength of the inputted password is then calculated by the following equation:

Score=$100 \times t$.

Finally, at step S29, the calculated password strength is outputted to the password strength checking screen, and the process ends as shown in FIG. 13.

In this way, the character string strength calculating program 212 processes a specified character string included in a password to be checked to calculate and output the strength thereof This enables a user to grasp which portions of a password are strong and which portions thereof are weak and to create a stronger password.

Figure 11:
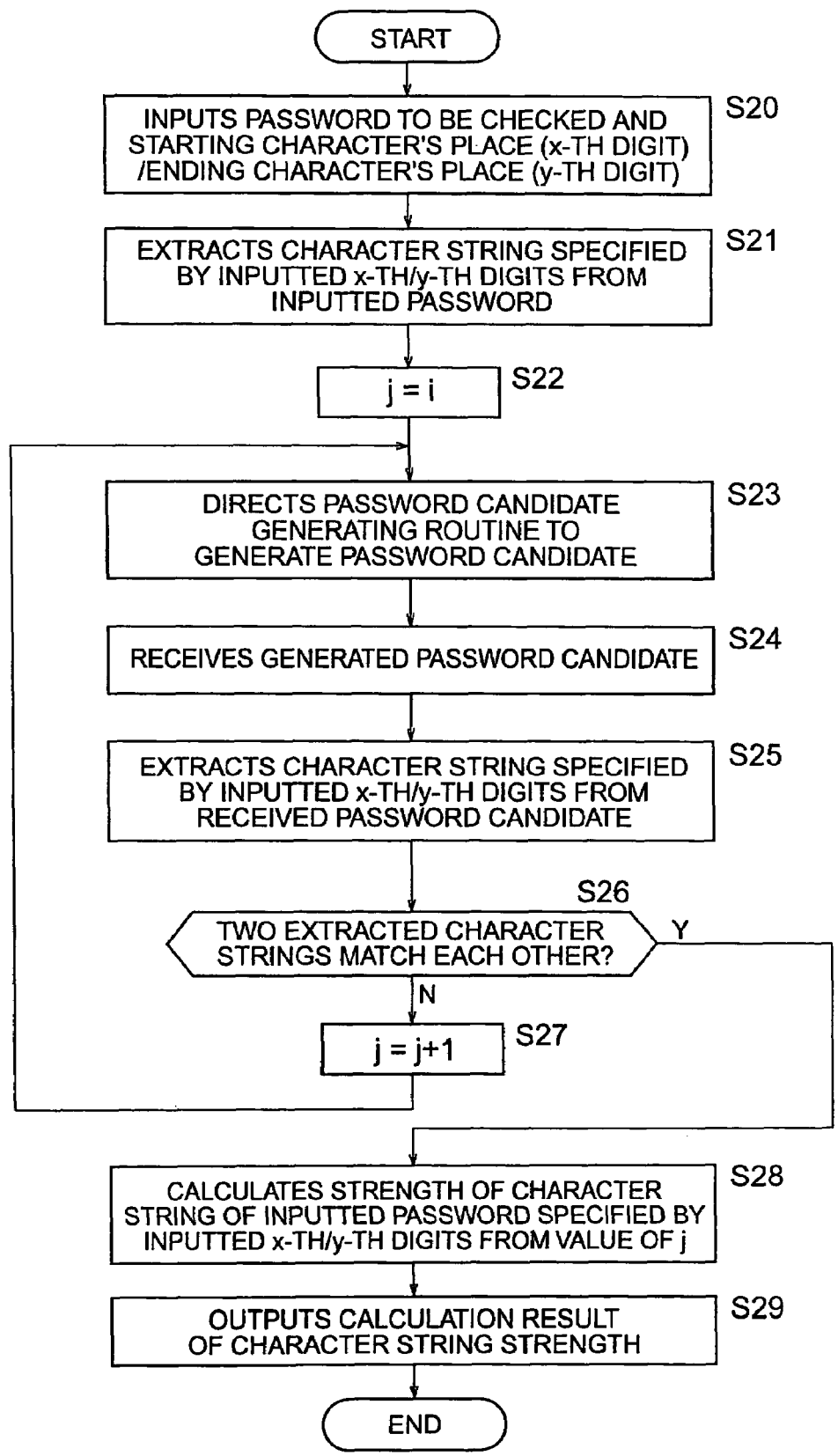
FIG. 11 shows a process flow executed by a character string strength calculating program.

Though, in the process flow in FIG. 11, strength is calculated for a character string included in a password to be checked, strength may be calculated for multiple character strings included in the password to be checked.

A process will now be described according to the process flow shown in FIG. 14, which is executed by the character strength calculating program 213 to realize the present invention.

Figure 14:
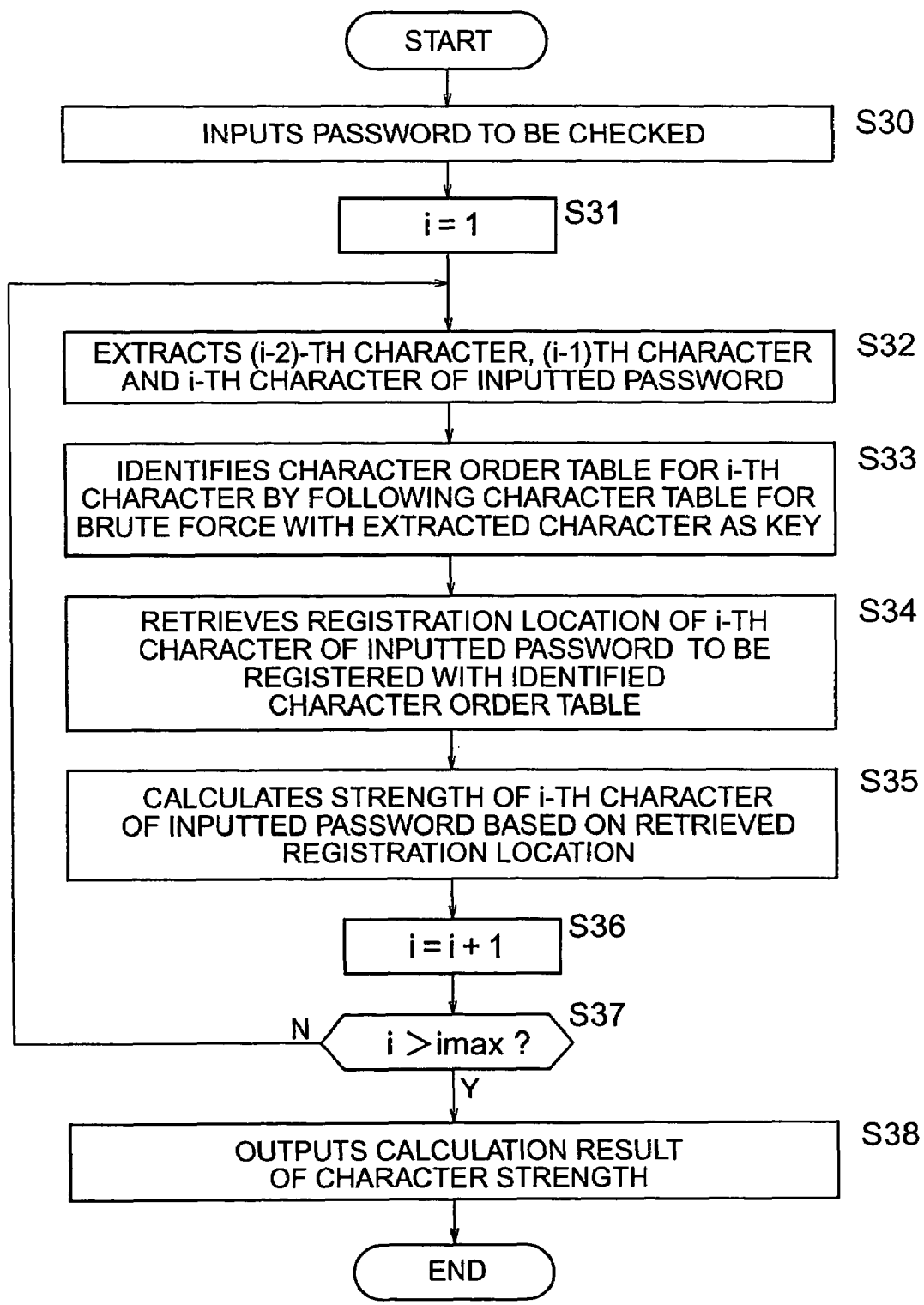
FIG. 14 shows a process flow executed by a character strength calculating program.

When a user specifies a password to be checked and issues a request for checking the password strength, the character strength calculating program 213 first inputs the password to be checked at step S30, and at the following step S31, sets "1" indicating the top character position (position of character) for a variable i indicating a character position (digit position) of the inputted password, as shown in the process flow in FIG. 14.

Then, at step S32, there are extracted the (i-2)th character, the (i-1)th character and the i-th character counted from the top character of the inputted password. If the (i-2)th and (i-1)th characters do not exist (in the case of i=1 or 2), then the further preceding existing characters are extracted.

Then, at step S33, a character rank table is identified for the i-th character by following the character table for brute force 215 having a data structure as shown in FIG. 10 using the extracted characters as a key.

In the character table for brute force 215 shown in FIG. 10, a character rank table used for a digit is identified based on the character for a digit immediately preceding the digit and the character for a digit further preceding the preceding character, and therefore a character rank table for the i-th character is identified by following the character table for brute force 215 using the three characters extracted at step S32 as a key.

Then, at step S34, the registration location is retrieved for the i-th character to be registered with the identified character rank table.

The registration location is retrieved because each of 95 characters to compose a password, for example, is registered with each character rank table in a descending order according to frequency of appearance at the character position, as described with reference to FIG. 10.

Then, at step S35, strength of the i-th character of the inputted password is calculated based on the retrieved registration location.

In other words, it is indicated that the closer to the top of the character rank table the registration location is (that is, the smaller the value is), the higher the appearance frequency is, that is, the weaker the character is against a brute force attack, and accordingly, a ratio value of the retrieved registration location and the number of characters to be registered with the character rank table (95, for example), for example, is calculated and normalized within a range of 0 to 100 to calculate strength of the i-th character of the inputted password.

Figure 15:
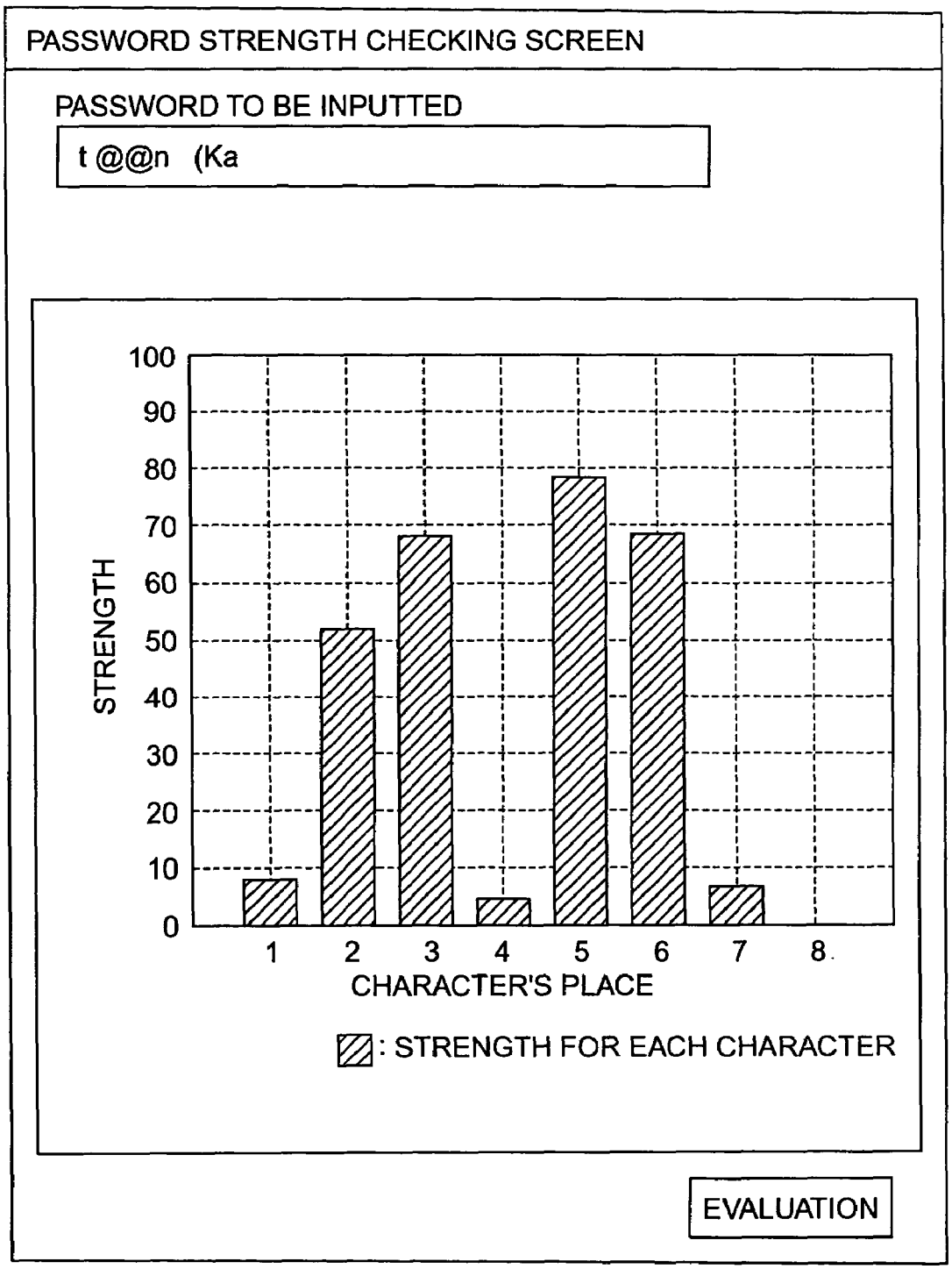
FIG. 15 is an explanatory diagram of a password strength checking screen.

Then, at step S36, the value of the variable i is incremented by one, and at the following step S37, it is determined whether or not the value of the variable i is larger than i max (the number of characters of the inputted password). If it is determined that the value is not larger, then the process returns to step S32 to process a character in the next character position. If it is determined that the value is larger, then the process proceeds to step S38, where the calculated character strength is outputted to the display of the input/output device 10, and the process ends as shown in FIG. 15.

In this way, the character strength calculating program 213 processes each character of a password to be checked to calculate and output the strength thereof.

This enables a user to grasp which portions of the password are strong and which portions thereof are weak and to create a stronger password.

Though, in the process flow in FIG. 14, strength is calculated for all the characters of a password to be checked, the strength may be calculated for a part of characters of the password to be checked.

A process will now be described according to the process flow shown in FIGS. 16 and 17, which is executed by the character strength transition value calculating program 214 to realize the present invention.

Figure 16:
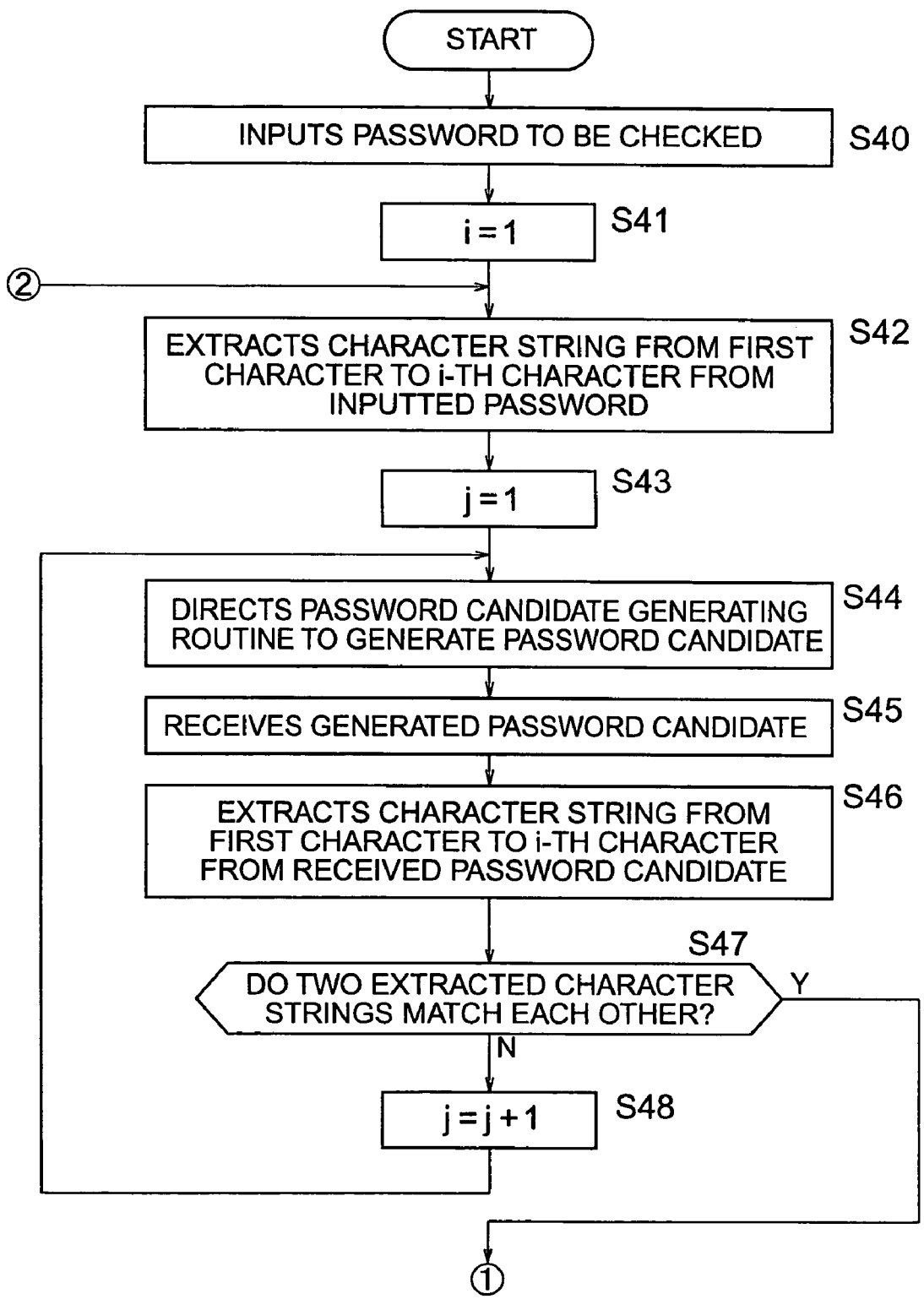
FIG. 16 shows a process flow executed by a character strength transition value calculating program.
Figure 17:
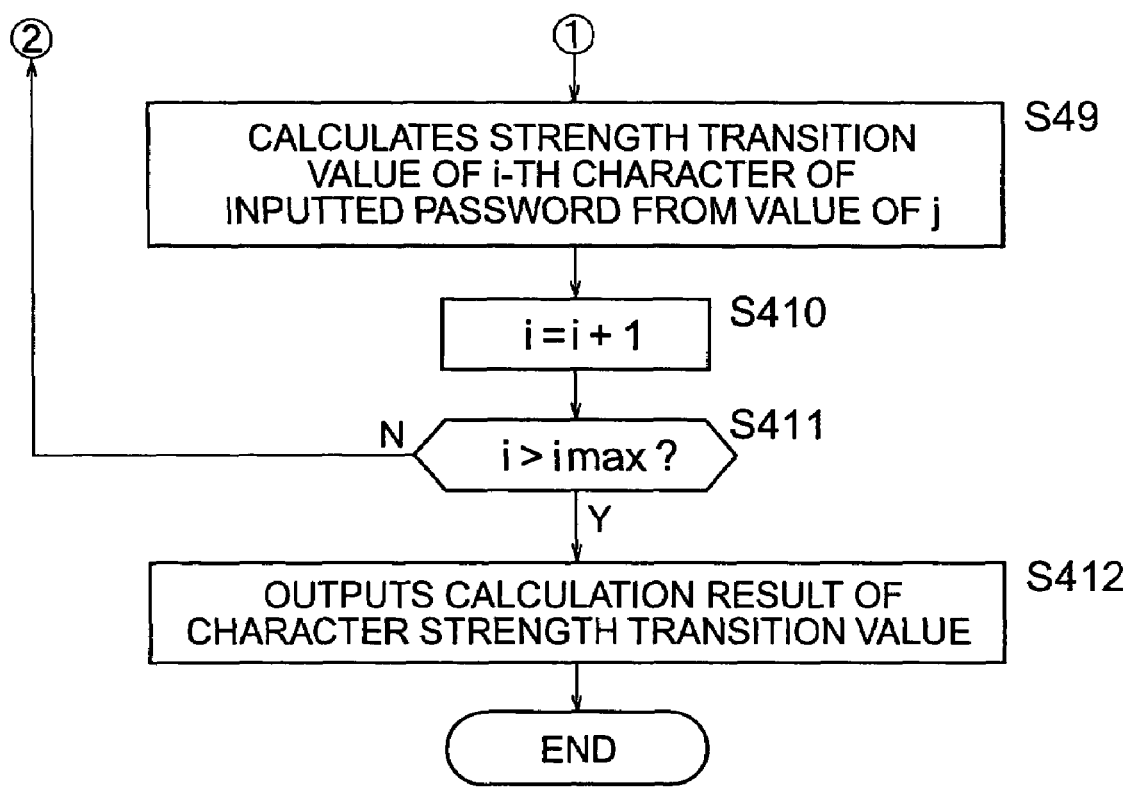
FIG. 17 shows a process flow executed by a character strength transition value calculating program.

When a user specifies a password to be checked and issues a request for checking the password strength, the character strength transition value calculating program 214 first inputs the password to be checked at step S40 as shown in the process flow in FIGS. 16 and 17.

Then, at step S41, "1" indicating the top character position is set for a variable i indicating the character position (digit position) of the inputted password, and at the following step S42, a character string formed by characters from the first character (top character) to the i-th character of the inputted password is extracted.

Then, at step S43, "1" is set for a variable j indicating the number of password candidates to be generated, and at the following step S44, the password candidate generating routine 211 is directed to generate a password candidate.

Upon receiving the direction to generate a password candidate, the password candidate generating routine 211 generates, according to the same generation procedure as that used by a password guessing tool, the first password candidate (plaintext) in a case that a password candidate is generated for the first time, and generates a password candidate (plaintext) following the previously generated password candidate in the case that the password candidate has been generated previously.

Then, at step S45, the generated password candidate is received from the password candidate generating routine 211, and at the following step S46, a character string formed by characters from the first character (top character) to the i-th character of the received password candidate is extracted.

Then, at step S47, it is determined whether or not the character string extracted at step S42 and the character string extracted at step S46 match each other. If it is determined that they do not match each other, then the process proceeds to step S48, where the value of the variable j is incremented by one. The process then returns to step S44 to direct generation of the next password candidate.

On the other hand, if it is determined at step S47 that the character string extracted at step S42 and the character string extracted at step S46 match each other, then the process proceeds to step S49, where the character strength transition value of the i-th character of the inputted password is calculated from the value of j.

For example, the ratio value t ($0 \leq t \leq 1$) of the value of j (the number of password candidates that have already been received) to the possible maximum number of password candidates to be generated by the password candidate generating routine 211 is calculated as follows:

$$t = j/(\text{the possible maximum number of password candidates to be generated}).$$

And then, a score indicating strength of the inputted password is then calculated by the following equation:

$$\text{Score} = 100 \times t.$$

Figure 18:
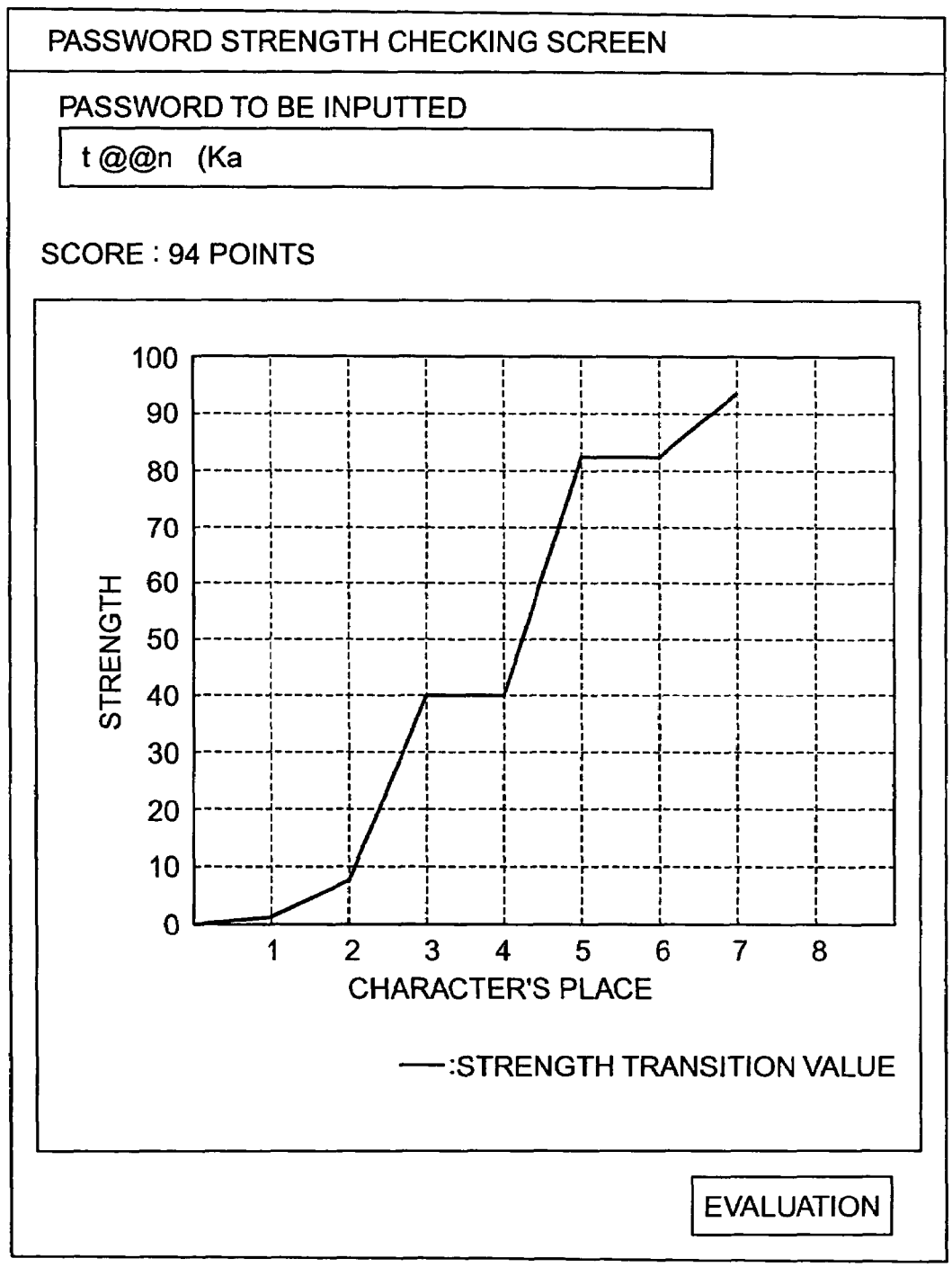
FIG. 18 is an explanatory diagram of a password strength checking screen.

Then, at step S410, the value of the variable i is incremented by one, and at the following step S411, it is determined whether or not the value of the variable i is larger than i max (the number of characters of the inputted password). If it is determined that the value is not larger, then the process returns to step S42 to process a character in the next character position. If it is determined that the value is larger, then the process proceeds to step S412, where the calculated character strength transition value is outputted to the display of the input/output device 10, and the process ends as shown in FIG. 18.

In this way, the character strength transition value calculating program 214 calculates and outputs a character strength transition value of the character of a password to be checked.

This enables a user to grasp which portions of the password are strong and which portions thereof are weak and to create a stronger password.

Figure 19:
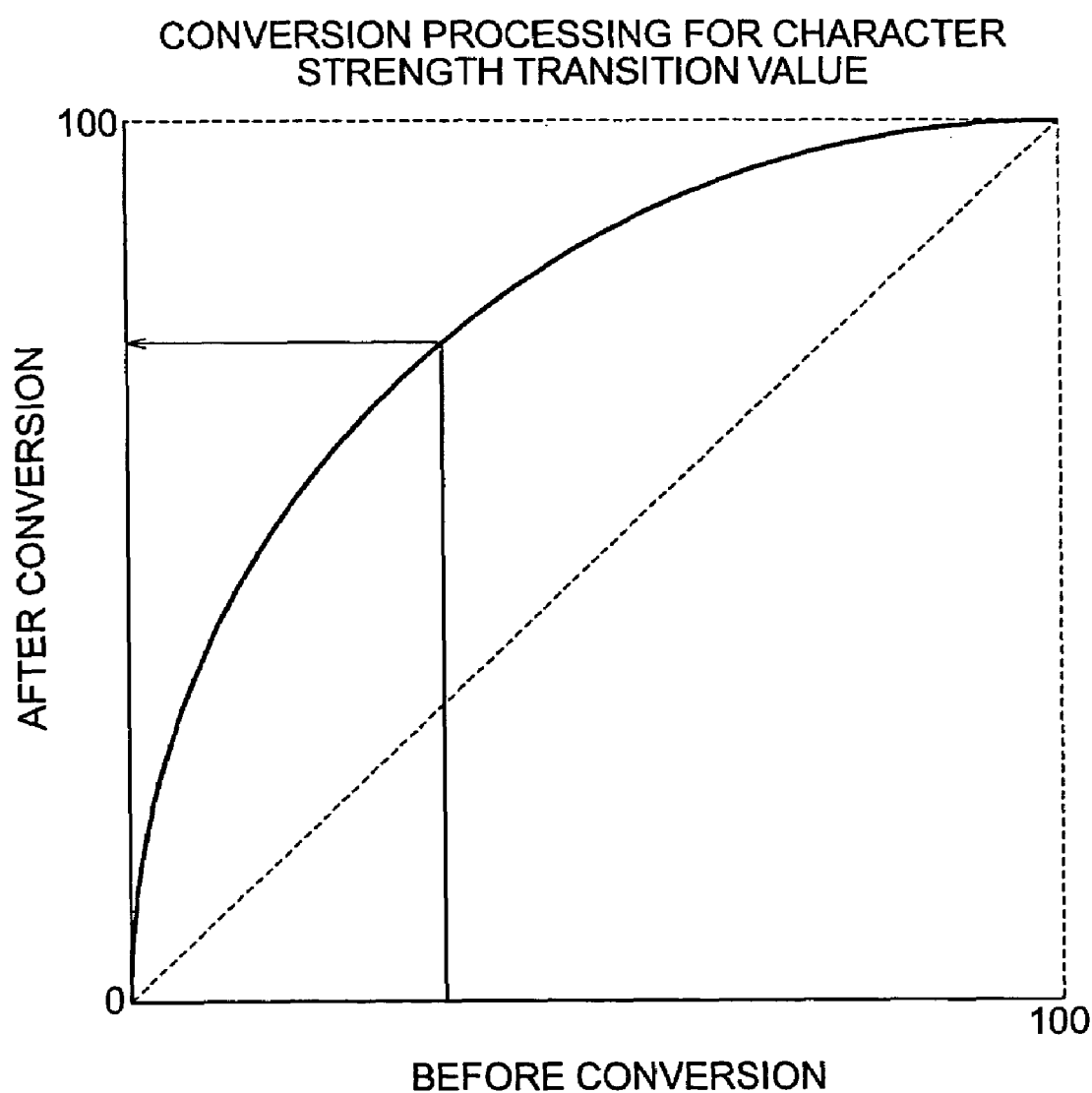
FIG. 19 is an explanatory diagram of a conversion process for a character strength transition value.

Instead of outputting the character strength transition value itself which is determined by "Score=100×t", it is possible to convert the character strength transition value into a value larger than the actual value where the actual value is small as shown in FIG. 19.

This conversion is performed for the reason that a password created by a human being tends to be weak and, therefore, the change in the character strength transition value is not apparently seen if the actual value is outputted without conversion as shown in FIG. 19.

Though, in the process flow in FIGS. 16 and 17, a character strength transition value is calculated for all the characters of a password to be checked, the character strength transition value may be calculated for a part of characters of the password to be checked.

In the process flow in FIGS. 16 and 17, for simplification of the description, it was explained that, when a character string formed by characters from the first character to the i-th character of an inputted password has been processed, generation of password candidates is repeated from the beginning for a character string formed by characters from the first character to the (i+1)h character. However, it is naturally possible to generate password candidate by succeeding the process for the character string formed by characters from the first character to the i-th character instead of using the repetition method.

As seen from the process flow in FIGS. 16 and 17, the character strength transition value calculated by the character strength transition value calculating program 214 does not simply indicate character strength of each character of a password but character strength of each character according to a descending character rank.

Figure 20:
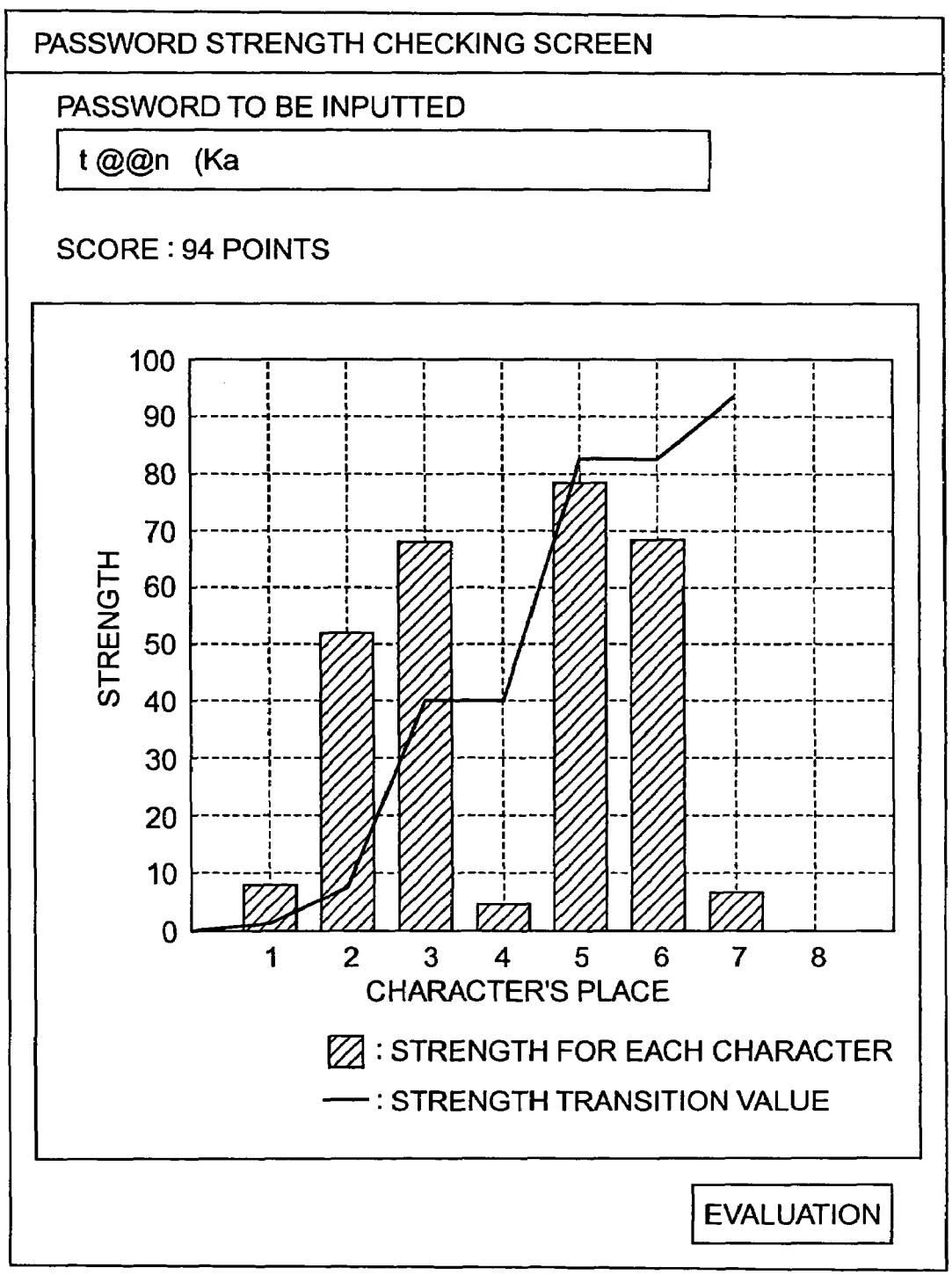
FIG. 20 is an explanatory diagram of a password strength checking screen.

Accordingly, as shown in FIG. 20, by outputting strength for each character calculated by the character strength calculating program 213 and a character strength transition value calculated by the character strength transition value calculating program 214 on the same password strength checking screen, a user can accurately grasp which portions of the password are strong and which portions thereof are weak.

For example, the last character of the password shown in FIG. 20 is "a". The character "a" is frequently used as the last character as seen from the character strength calculated by the character strength calculating program 213. But, it intensifies strength of a character string password "t@@n (Ka" as seen from the character strength transition value calculated by the character strength transition value calculating program 214.

Figure 21:
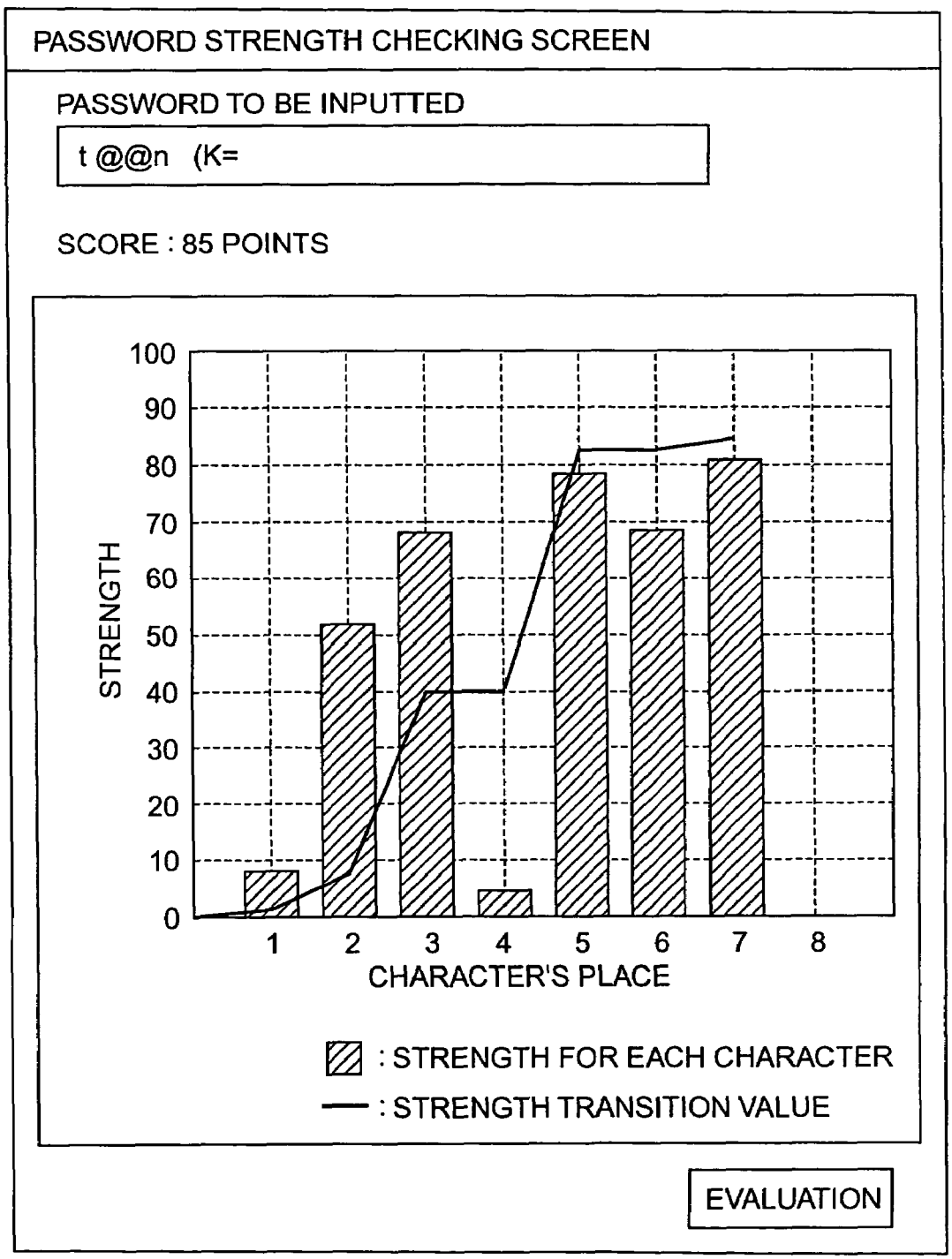
FIG. 21 is an explanatory diagram of a password strength checking screen.

On the other hand, in a case that a character "=" is used instead of "a", as shown in FIG. 21, the character "=" hardly intensifies the strength of the character string password "t@@n(K=" as seen from the character strength transition value calculated by the character strength transition value calculating program 214, though it is seldom used as the last character as seen from the character strength calculated by the character strength calculating program 213.

In this way, by outputting strength for each character calculated by the character strength calculating program 213 and a character strength transition value calculated by the character strength transition value calculating program 214 on the same password strength checking screen, a user can accurately grasp which portions of the password are strong and which portions thereof are weak.

Though the present invention has been described according to the embodiment shown in the figures, it is not limited thereto. For example, though a character table for brute force 215, which has a table structure shown in FIG. 10, was assumed in the embodiment, application of the present invention is not limited to the character table for brute force 215 having such a table structure.

Third Embodiment

Figure 22:
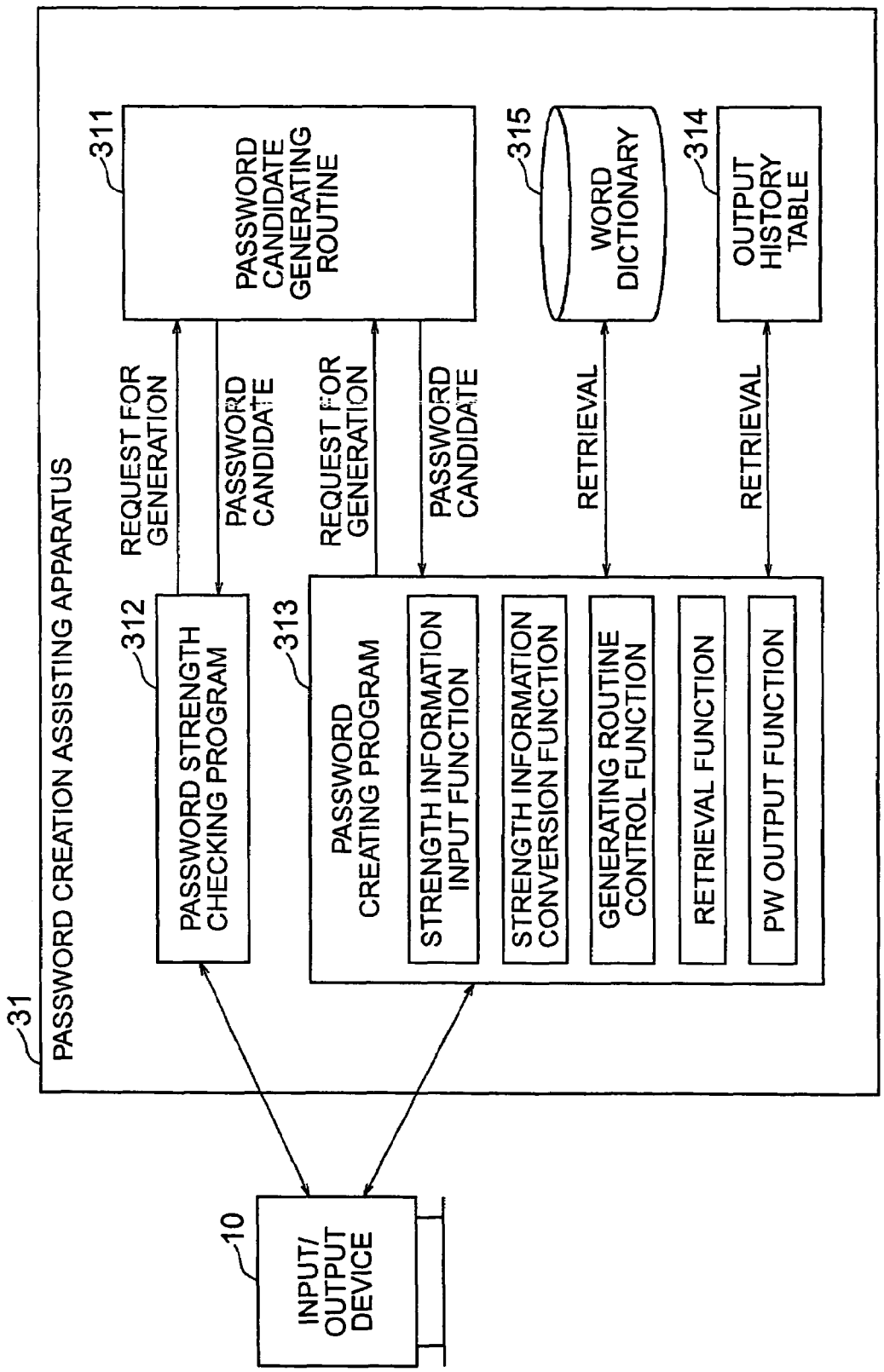
FIG. 22 shows an embodiment of a password creation assisting apparatus provided with the present invention.

The present invention will now be described below in detail according to a third embodiment of the present invention. FIG. 22 shows an embodiment of a password creation assisting apparatus 31 provided with the present invention.

The password creation assisting apparatus 31 provided with the present invention, shown in FIG. 22, performs processing for measuring strength of a password to be checked and for creating a password with a specified strength and comprises: an input/output device 10 as means for interacting with a user, a password candidate generating routine 311 (or 111) to be used by a password guessing tool such as "John the Ripper" to generate a plaintext password candidate, a password strength checking program 312 (or 112) for using the password candidate generating routine 311 to check strength of a password to be checked, a password creating program 313 for using the password candidate generating routine 311 to create a password with a guaranteed strength, which is prepared to realize the present invention, an output history table 314 for recording passwords created by the password creating program 313, and a word dictionary 315 for accumulating information of possible words to be used as a password.

The password creating program 313 prepared to realize the present invention is provided in a recording medium, such as a semiconductor memory, or via a network.

As seen from a process flow described later, the password creating program 313 comprises functions of: inputting strength information of a password to be created; converting the inputted strength information into password candidate generation rank information that is generated by the password candidate generating routine 311; creating a password with a guaranteed strength by controlling the password candidate generating routine 311; searching the output history table 314 and the word dictionary 315; and outputting the created password.

The password candidate generating routine 311 is used in a password guessing tool such as "John the Ripper". It generates more than 7 trillion plaintext password candidates in a predetermined order, for example, by first generating plaintext password candidates using character strings written in a dictionary and then generating plaintext password candidates using all possible character strings to be used as a password.

A process will now be described according to the process flow shown in FIG. 23, which is executed by the password strength checking program 312.

Figure 23:
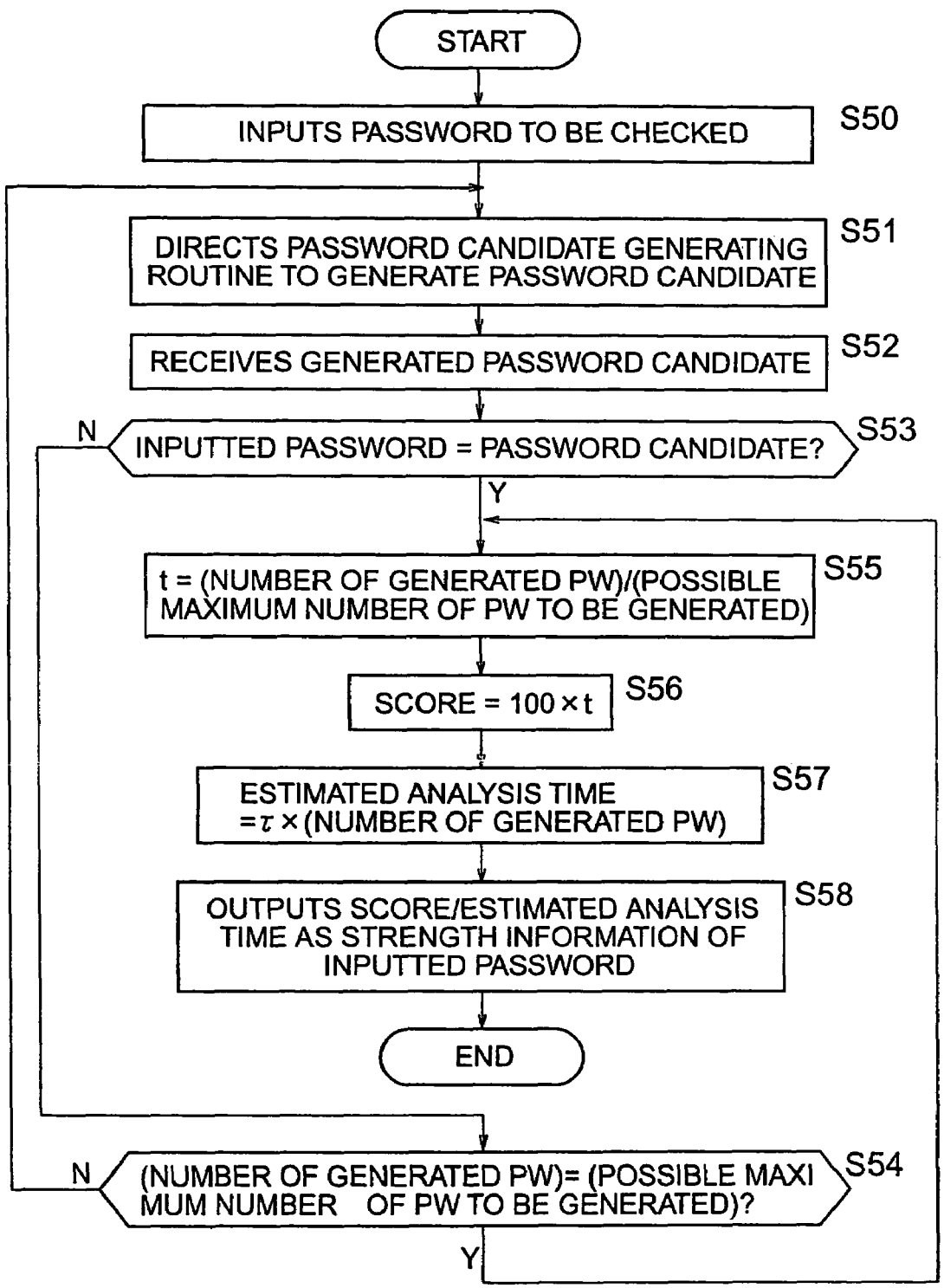
FIG. 23 shows a process flow executed by a password strength checking program.

When a password to be checked is specified and a request for checking the password strength is issued from the input/output device 10, the password strength checking program 312 first inputs the password to be checked at step S50, and at the following step S51, directs generation of a password candidate to the password candidate generating routine 311 as shown in the process flow in FIG. 23.

Upon receiving the direction to generate a password candidate, the password candidate generating routine 311 generates, according to the same generation procedure as that used by a password guessing tool, the first password candidate (plaintext) in a case that a password candidate is generated for the first time, and generates a password candidate (plaintext) following the previously generated password candidate in the case that the password candidate has been generated previously.

Then, at step S52, the generated password candidate is received from the password candidate generating routine 311, and at the following step S53, it is determined whether or not the inputted password and the received password candidate match each other.

If it is determined that the inputted password and the password candidate received from the password candidate generating routine 311 do not match each other based on the determination, then the process proceeds to step S54, where it is determined whether or not the number of password candidates that have already been received and the possible maximum number of password candidates to be generated by the password candidate generating routine 311 match each other. If it is determined that they do not match each other, then the process returns to step S51 to direct generation of the next password candidate.

While repeating the process from step S50 to step S54 in this way, the process proceeds to step S55 when determining that the inputted password and the password candidate received from the password candidate generating routine 311 match each other at step S53, or when determining that the number of password candidates that have already been received and the possible maximum number of password candidates to be generated by the password candidate generating routine 311 match each other at step S54. The step S55 is to calculate the ratio value t ($0 \leq t \leq 1$) of the number of password candidates which have been received to the possible maximum number of password candidates to be generated by the password candidate generating routine 311. In this case, t=(the number of the generated password candidates)/(the possible maximum number of password candidates).

Then, at step S56, the score indicating strength of the inputted password is calculated based on the following equation:

$$\text{Score} = 100 \times t.$$

Then, at step S57, a time is estimated which is required for analysis when a malicious user brute-force attacks the inputted password using a password guessing tool, based on the following equation:

Estimated analysis time=τ×(the number of the generated password candidates).

In the above equation, τ indicates a time required for generating and hashing (encrypting) a password candidate and comparing it with an encrypted password to be brute-force attacked to determine whether or not they match each other.

Finally, at step S58, the calculated score and the estimated analysis time is outputted to the input/output device 10 as strength information of the inputted password to be checked, and the process ends.

In this way, the password strength checking program 312 measures how many plaintext password candidates are generated by a password guessing tool used for a brute force attack to obtain, the password to be checked, and determines the strength of the password based on the number of the generated plaintext password candidates.

The password creating program 313 prepared to realize the present invention makes a user input a time equal to an estimated analysis time calculated by the password strength checking program 312 and creates a password having a strength indicated by an estimated analysis time corresponding to the inputted time, so that there is created and outputted a password with a guaranteed strength, such as a password which can endure a brute force attack for two years, for example.

A process will now be described according to the process flow shown in FIG. 24, which is executed by the password strength checking program 313 to realize the present invention.

Figure 24:
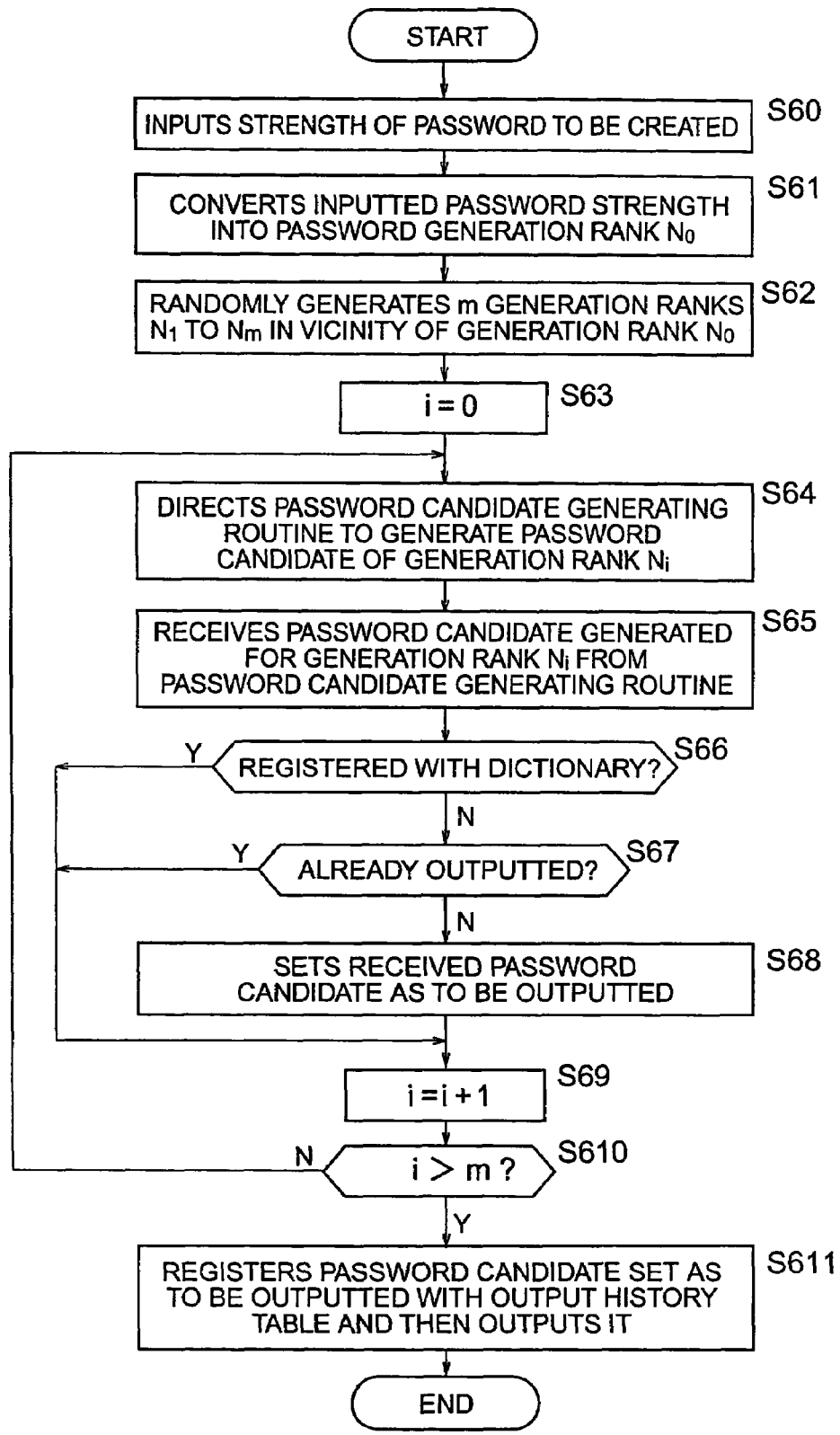
FIG. 24 shows a process flow executed by a password creating program.

When a input screen for password creation is shown on a display of the input/output device 10, which is provided with an input area for a password strength as shown in FIG. 25, and a user inputs into the input area a time, which is to be a password strength, to issue a request for generation of a password, the password creating program 313 first inputs the time (years, days) to be a password strength at step S60, as shown in the process flow in FIG. 24.

Then, at step S61, the inputted time is divided by the τ described above to convert the inputted time into a rank of a password candidate to be generated by the password candidate generating routine 311.

As described above, the following equation has been established:

Estimated analysis time=τ×(the number of generated password candidates).

By dividing the inputted time by τ based on the equation, the inputted time is converted into a generation rank (hereinafter, referred to as "$N_0$") of a password candidate to be generated by the password candidate generating routine 311.

Then, at step S62, m generation ranks from $N_1$ to $N_m$ are randomly generated in the vicinity of the generation rank $N_0$. At the following step S63, "0" is set for a variable i used for specification of a generation rank $N_i$ (i=0 to m).

Then, at step S64, the password candidate generation routine 311 is directed to generate a password candidate in the generation rank $N_i$.

Figure 26:
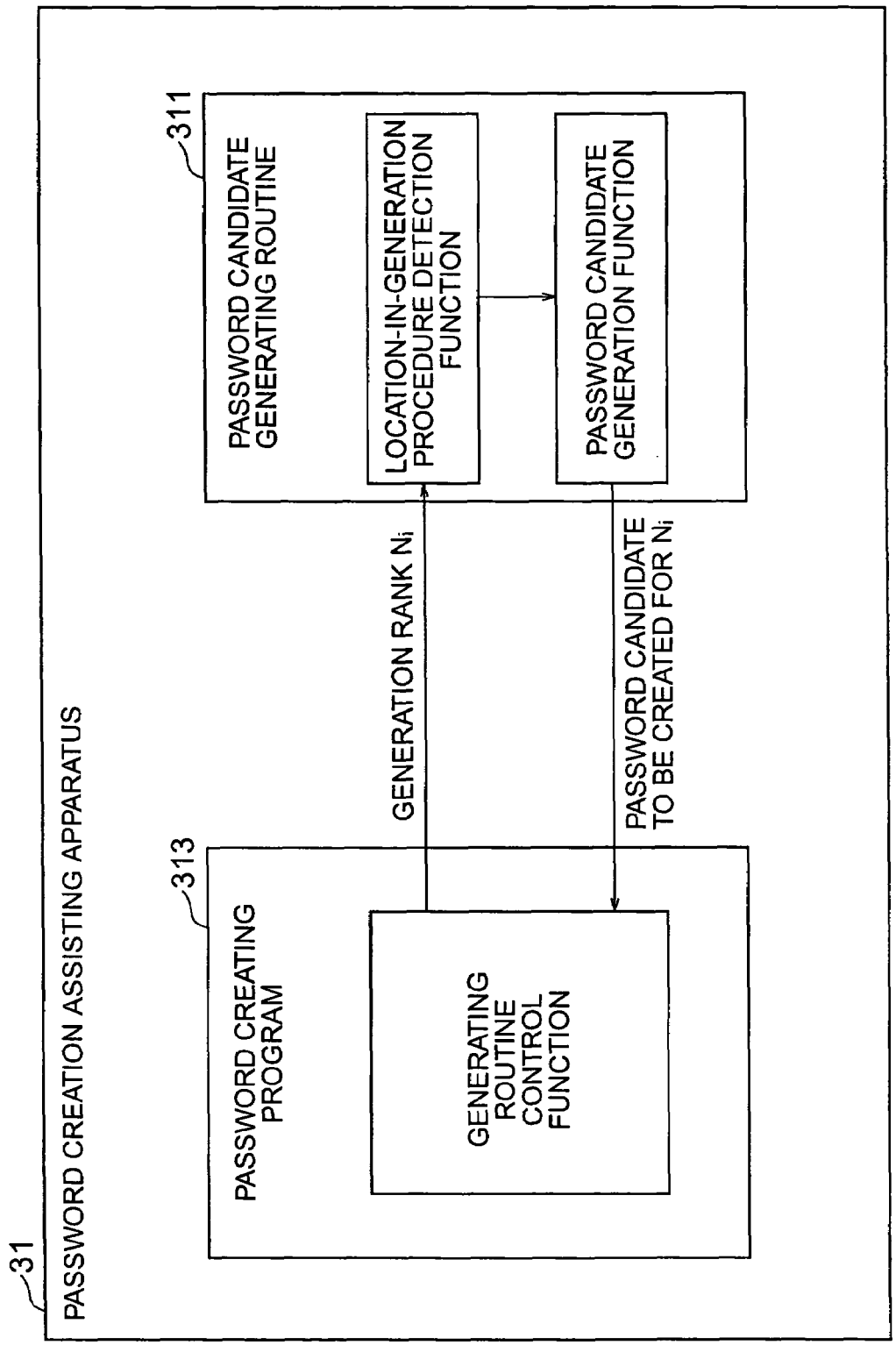
FIG. 26 is an explanatory diagram of a process executed by a password candidate generating routine.

Upon receiving the direction, the password candidate generating routine 311 detects a location in the generation procedure, the generation rank $N_i$, and generates and returns a password candidate for the location, as shown in FIG. 26.

Then, at step S65, the password candidate generated for the generation rank $N_i$ is received from the password candidate generating routine 311.

Then, at step S66, it is determined whether or not the received password candidate is registered with the word dictionary 315. If it is determined not to be registered with the word dictionary 315, then the process proceeds to step S67, where it is determined whether or not the received password candidate has already been outputted by determining whether or not it is recorded in the output history table 314.

If it is determined that the password candidate received from the password candidate generating routine 311 has not been outputted yet based on the determination at step S67, then the process proceeds to step S68, where the received password candidate is set as to be outputted. The process then is proceeded to step S69 and increments the value of the variable i by one.

On the other hand, if it is determined at step S66 that the received password candidate is registered with the word dictionary 315, or if it is determined at step S67 that the received password candidate has already been outputted. Then the processing at step S68 is omitted and immediately the process is proceeded to step S69 because the password candidate is not suitable for use as a password. At step S69, the value of the variable i is incremented by one.

Then, at step S610, it is determined whether or not the value of the variable i is larger than m. If it is determined that the value of the variable i is not larger than m, then the process returns to step S64 to perform processing for the next generation rank $N_i$. If it is determined that the value of the variable i is larger than m, then the process proceeds to step S611. At step S611, the password candidate set as a password candidate to be outputted is registered with the output history table 314 and outputted to the input/output device 10, and then the process ends.

In this way, when a time, such as two years, is specified on a input screen for password creation as shown in FIG. 25 to issue a request for creation of a password, the password creating program 313 creates, for example, 10 password candidates which can endure a brute force attack for two years and causes them to be outputted as shown in FIG. 27.

This enables a user to obtain a password which can endure a brute force attack for a long time when requiring such a password, simply by inputting a longer time on the input screen for password creation.

For a password which can endure a brute force attack for a long time, however, more symbols which are not usually used are to be used. Accordingly, when a user wants a password with more characters and numerics, which is easy to remember, he must input an appropriate time on the input screen for password creation in consideration of both points.

Though, in the process flow in FIG. 24, the password candidate generated for the generation rank No was explained to be included in password candidates to be outputted, it is also possible to exclude such a password candidate by setting "1" for the variable i at step S63.

Figure 28:
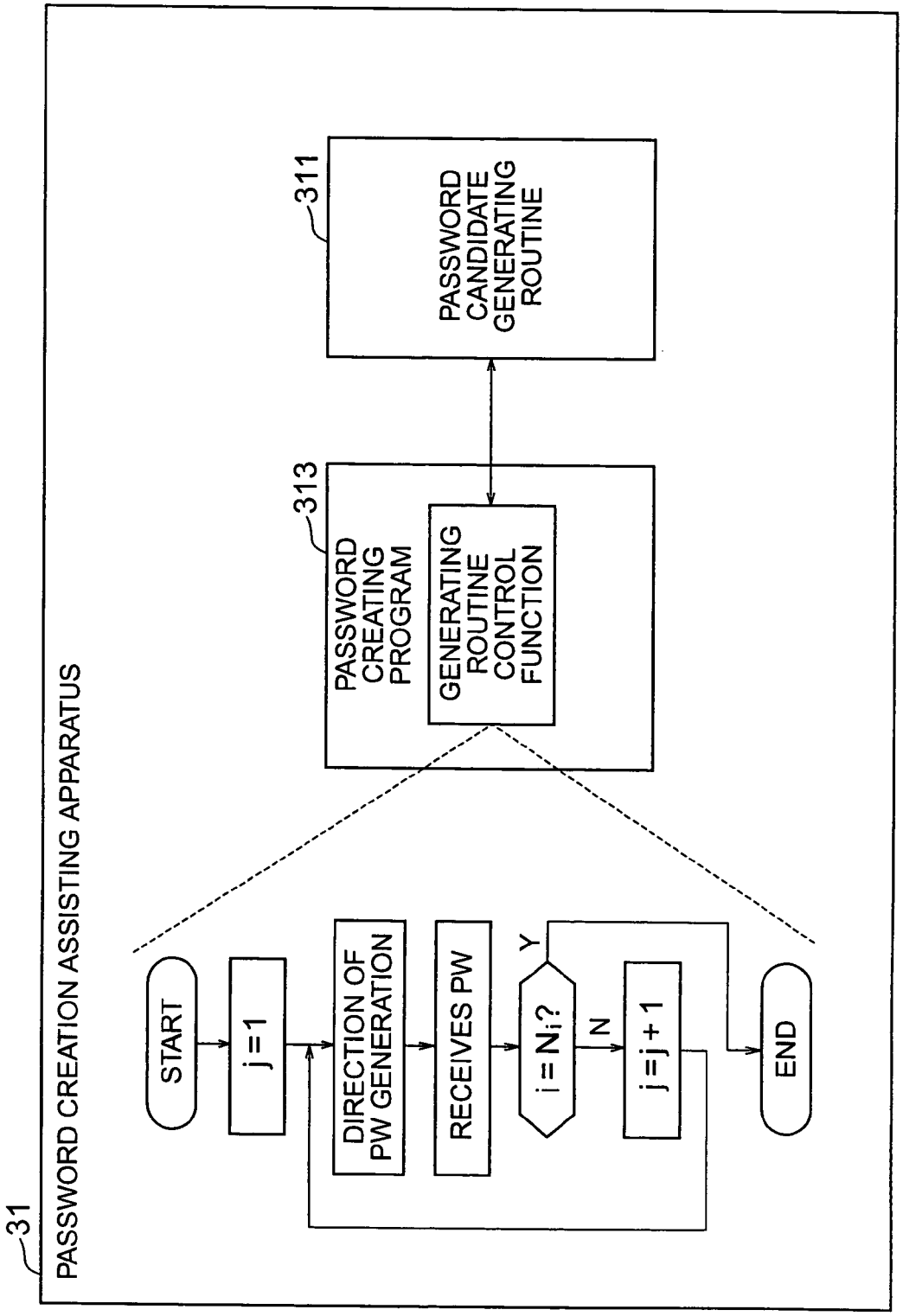
FIG. 28 is an explanatory diagram of a process executed by a password creating program.

In the process flow in FIG. 24, the password candidate generating routine 311 was explained to have a function of generating, upon receiving a generation rank $N_i$, a password candidate for the generation rank $N_i$ on the first attempt. If such a function is not provided, the password creating program 313 may repeatedly request for generation of a password candidate from the password candidate generating routine 311 to obtain a password candidate generated for the $N_i$, as shown in FIG. 28.

Though, in the process flow in FIG. 24, a user is made to input a time to be a password strength, the generation rank $N_0$ may be directly inputted instead of the time.

Figure 29:
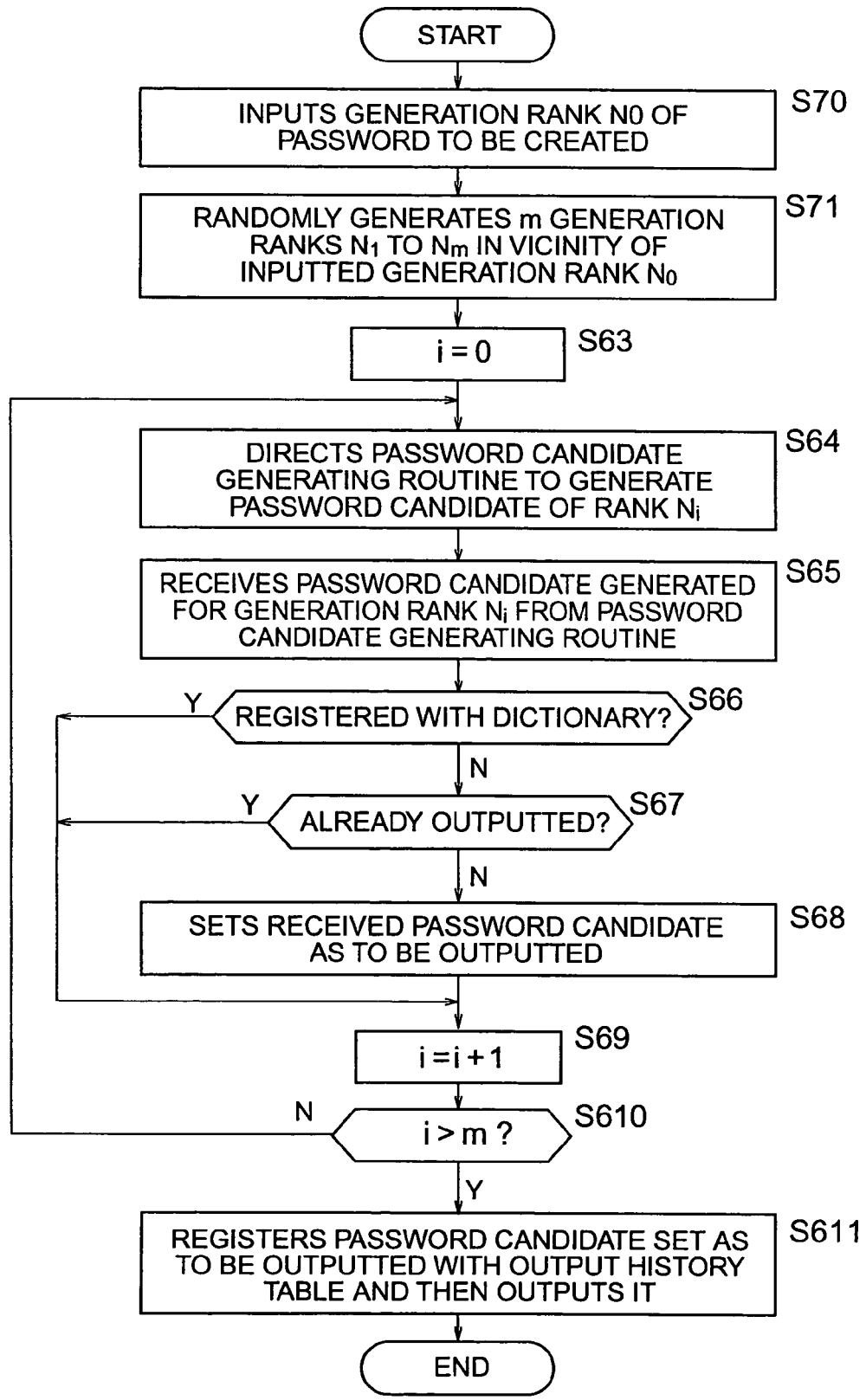
FIG. 29 shows a process flow executed by a password creating program.

In this case, the password creating program 313 executes the process flow in FIG. 29 (process flow for executing steps S70 and S71 instead of steps S60 to S62 of the process flow FIG. 24) instead of the process flow in FIG. 24.

Though, in the process flow in FIG. 24, a time is inputted as a password strength, other information may be inputted as a password strength, such as a score determined by the process flow in FIG. 23.

Figure 30:
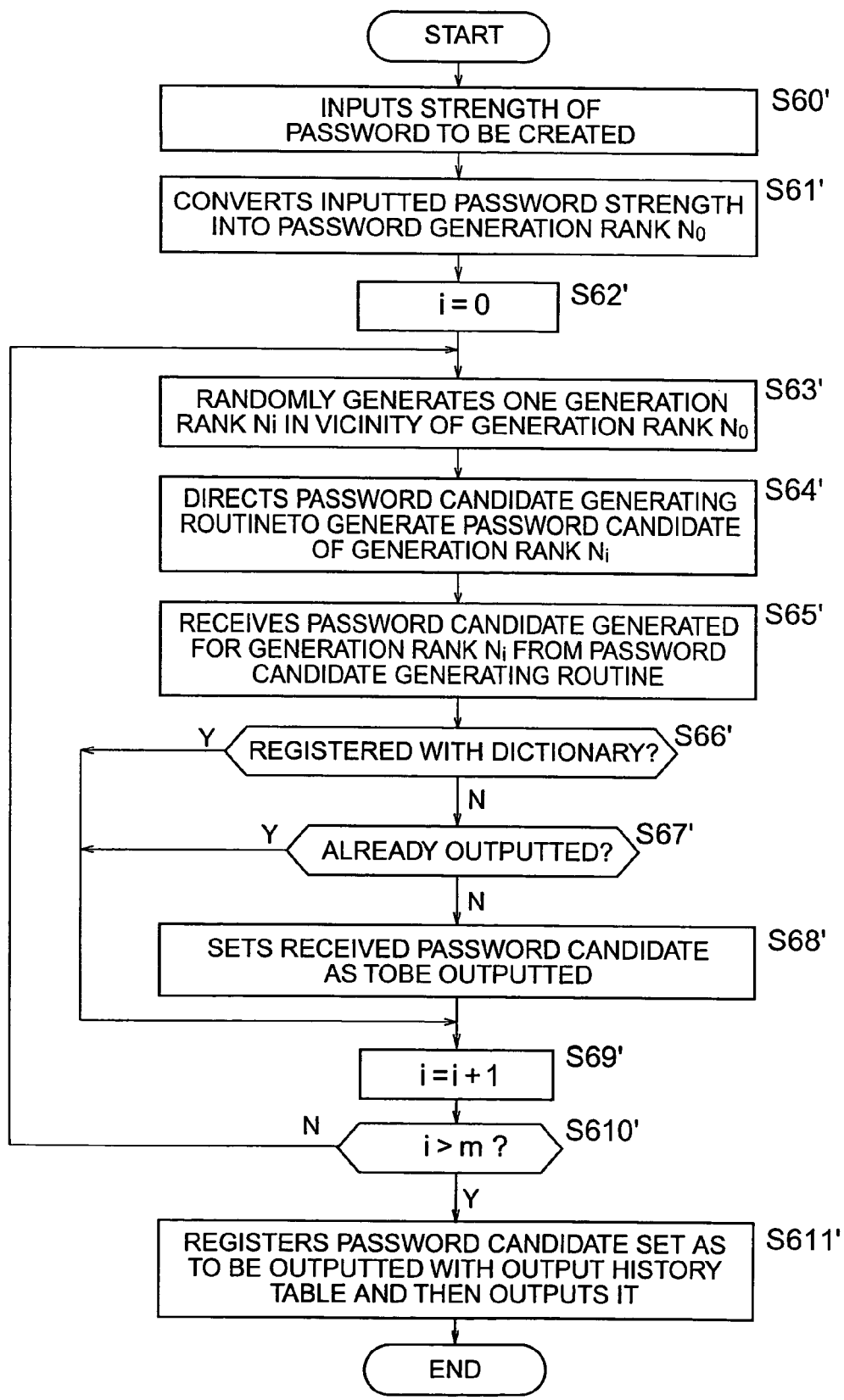
FIG. 30 shows a process flow executed by a password creating program.
Figure 31:
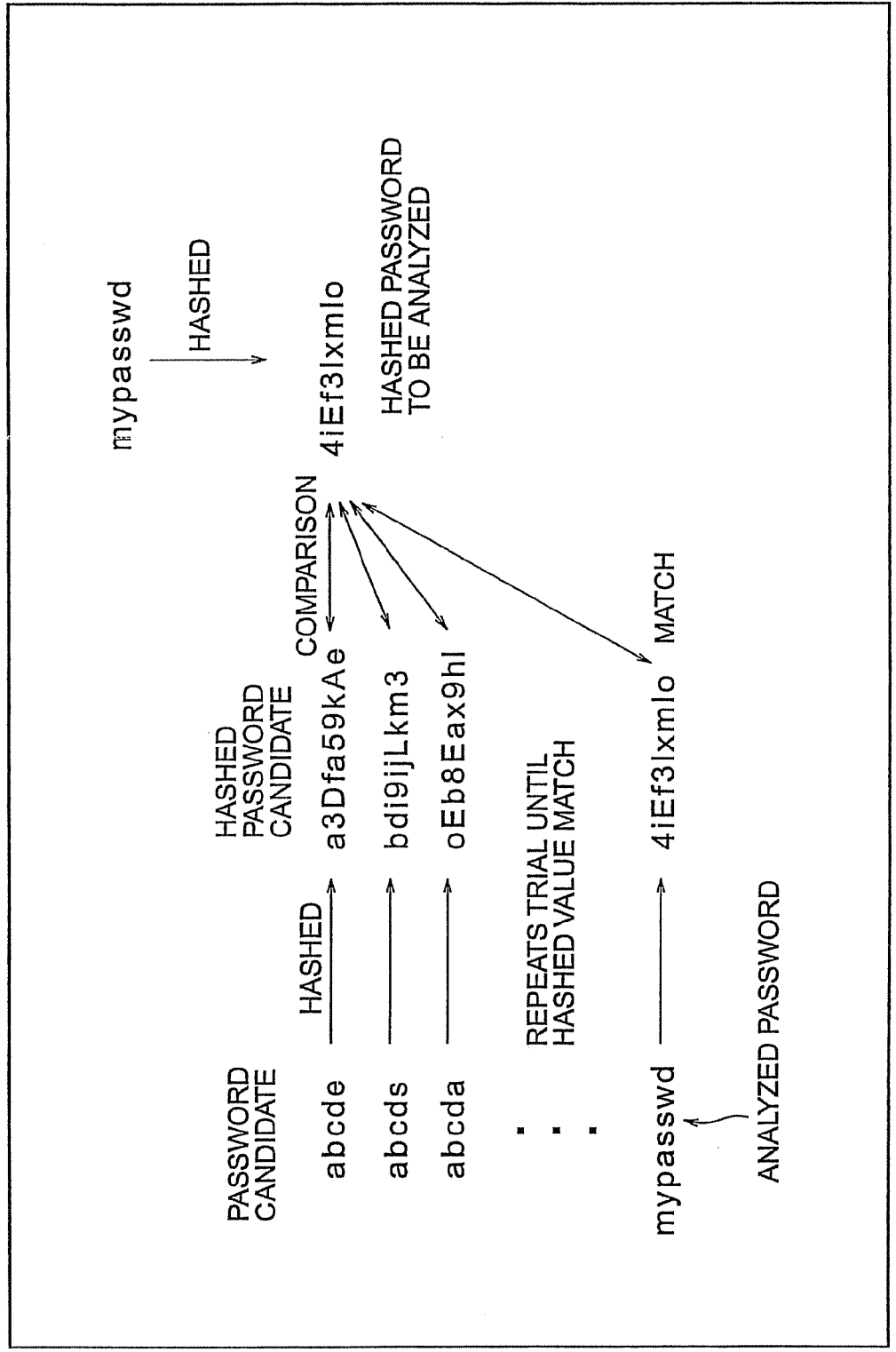
FIG. 31 is an explanatory diagram of a brute force attack made against a password.

The password creating program 313 may execute the process flow in FIG. 30 instead of the process flow in FIG. 24. If following this process flow, m password candidates are always created and outputted in response to input of a password strength.

In this way, according to the present invention, by measuring how many plaintext password candidates are generated by a password guessing tool used for a brute force attack to obtain, the password to be checked, the password strength is determined and outputted based on the number of the generated plaintext password candidates. Accordingly, the numerically represented password strength can be calculated in a practical duration of time, and thereby it is possible to objectively and accurately check the password strength. Thus, by using the present invention, it is possible to objectively educate employees about what passwords are strong and thereby enhance security for internal information and the like.

According to the present invention, strength is outputted for a character string included in a password, so that a user can grasp which portions of the password are strong and which portions thereof are weak and can create a stronger password. Furthermore, according to the present invention, strength is outputted for each character of a password, so that a user can grasp which portions of the password are strong and which portions thereof are weak and can create a stronger password. Furthermore, according to the present invention, a character strength transition value of a password is outputted, so that a user can grasp which portions of the password are strong and which portions thereof are weak and can create a stronger password.

Furthermore, according to the present invention, it is possible to create a password with a guaranteed strength such as a password which can endure a brute force attack for two years. Thus, according to the present invention, a user can use a password without anxiety.

What is claimed is:

1. A password creating method, comprising:
inputting information of a generation rank for a password to be created;
using a password candidate generating routine for generating a plaintext password candidate according to a generation procedure which is used for generating the password to be checked in a password guessing tool, to obtain a password candidate generated for the generation rank by a password candidate generating routine; and
outputting the generated plaintext password candidate as a password to be created, wherein one or more generation ranks are created by changing a value of the generation rank randomly to obtain password candidates generated at the created generation ranks in addition to or instead of the generation rank.

2. The password creating method according to claim 1, wherein the outputting includes determining whether or not the generated password candidate matches any password outputted in the past and, if not, outputs the generated password candidate as a password to be created.

3. The password creating method according to claim 1, wherein the outputting includes determining whether or not the generated password candidate matches any word registered with a dictionary and, if not, outputs the generated password candidate as a password to be created.

4. A computer readable medium storing a password creating program which program, when executed in by a computer, causes the computer to execute:
inputting information of a generation rank for a password to be created;
using a password candidate generating routine for generating a plaintext password candidate according to a generation procedure which is used for generating the password to be checked in a password guessing tool, to obtain a password candidate generated for the generation rank by the password candidate generating routine; and
outputting the obtained password candidate as a password to be created, wherein one or more generation ranks are created by changing a value of the generation rank randomly, to obtain password candidates generated at the created generation ranks in addition to or instead of the generation rank.

5. A password creating method, comprising:
inputting information indicating strength of a password to be created;
converting the information indicating strength into information of a generation rank of a password candidate to be generated by a password candidate generating routine for generating a plaintext password candidate according to a generation procedure which is used for generating the password in a password guessing tool;
obtaining a password candidate generated for the generation rank using the password candidate generating routine; and
outputting the obtained password candidate as a password to be created,
wherein the obtaining includes creating one or more generation ranks by changing a value of the generation rank randomly of an input value of the generation rank according to the information, to obtain password candidates generated at the created generation ranks in addition to or instead of the generation rank.

6. A password creating, comprising:
inputting information indicating strength of a password to be created;
converting the information indicating strength into information of a generation rank of a password candidate to be generated by a password candidate generating routine for generating a plaintext password candidate according to a generation procedure which is used for generating the password in a password guessing tool;
obtaining a password candidate generated for the generation rank using the password candidate generating routine; and
outputting the obtained password candidate as a password to be created,
wherein the outputting includes determining whether or not the obtained password candidate matches any password outputted in the past and, if not, outputs the obtained password candidate as a password to be created.

7. The computer readable medium storing a password creating program, which program, when executed by a computer, causes the computer to execute:

inputting information indicating strength of a password to be created;

converting the information indicating strength into information of a generation rank of a password candidate to be generated by a password candidate generating routine for generating a plaintext password candidate according to a generation procedure which is used for generating the password to be checked in a password guessing tool;

using the password candidate generating routine to obtain a password candidate generated for the generation rank by the password candidate generating routine; and outputting the obtained password candidate as a password to be created, wherein the obtaining includes creating one or more generation ranks by changing a value of the generation rank randomly to obtain password candidates generated at the created generation ranks in addition to or instead of the generation rank.

* * * * *

UNITED STATES PATENT AND TRADEMARK OFFICE
CERTIFICATE OF CORRECTION

| | | |
|---|---|---|
| PATENT NO. | : 7,367,053 B2 | Page 1 of 1 |
| APPLICATION NO. | : 10/677277 | |
| DATED | : April 29, 2008 | |
| INVENTOR(S) | : Daiji Sanai et al. | |

It is certified that error appears in the above-identified patent and that said Letters Patent is hereby corrected as shown below:

Column 22, Line 11, after "program" insert --,--.

Column 22, Line 11, after "executed" delete "in".

Signed and Sealed this

Twenty-third Day of December, 2008

JON W. DUDAS
*Director of the United States Patent and Trademark Office*